United States Patent
Palermo et al.

(10) Patent No.: US 11,249,779 B2
(45) Date of Patent: Feb. 15, 2022

(54) ACCELERATOR INTERCONNECT ASSIGNMENTS FOR VIRTUAL ENVIRONMENTS

(71) Applicant: Intel Corporation, Santa Clara, CA (US)

(72) Inventors: Stephen Palermo, Chandler, AZ (US); Gerald Rogers, Chandler, AZ (US); Shih-Wei Chien, Shanghai (CN); Namakkal Venkatesan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 856 days.

(21) Appl. No.: 15/853,670

(22) Filed: Dec. 22, 2017

(65) Prior Publication Data

US 2019/0034363 A1    Jan. 31, 2019

Related U.S. Application Data

(60) Provisional application No. 62/553,608, filed on Sep. 1, 2017.

(51) Int. Cl.
| | |
|---|---|
| *G06F 9/455* | (2018.01) |
| *G06F 13/16* | (2006.01) |
| *G06F 13/40* | (2006.01) |
| *G06F 13/42* | (2006.01) |

(Continued)

(52) U.S. Cl.
CPC ........ *G06F 9/45558* (2013.01); *G06F 9/3877* (2013.01); *G06F 9/45529* (2013.01);
(Continued)

(58) Field of Classification Search
CPC .... G06F 2009/455; G06F 9/4881; G06F 9/50; G06F 13/4068; G06F 13/4282;
(Continued)

(56) References Cited

U.S. PATENT DOCUMENTS

2016/0057074 A1* 2/2016 Jacobs .............. H04L 47/70
709/226
2018/0101374 A1* 4/2018 Chittigala .......... G06F 11/2028
(Continued)

FOREIGN PATENT DOCUMENTS

WO  WO-2015099719 A1 * 7/2015 ........... G06F 15/173

OTHER PUBLICATIONS

"OpenFlow Switch Specification," Open Networking Foundation, Version 1.5.1, Mar. 26, 2015, 283 pages.
(Continued)

*Primary Examiner* — Henry Tsai
*Assistant Examiner* — Christopher A Daley
(74) *Attorney, Agent, or Firm* — Schwabe, Williamson & Wyatt, P.C.

(57) ABSTRACT

A computer system may comprise a multi-chip package (MCP), which includes multi-core processor circuitry and hardware accelerator circuitry. The multi-core processor circuitry may comprise a plurality of processing cores, and the hardware accelerator circuitry may be coupled with the multi-core processor circuitry via one or more coherent interconnects and one or more non-coherent interconnects. A coherency domain of the MCP may be extended to encompass the hardware accelerator circuitry, or portions thereof An interconnect selection module may select an individual coherent interconnect or an individual non-coherent interconnect based on application requirements of an application to be executed and a workload characteristic policy. Other embodiments are described and/or claimed.

35 Claims, 7 Drawing Sheets

(51) Int. Cl.
*G06F 12/0815* (2016.01)
*G06F 12/0875* (2016.01)
*G06F 12/0811* (2016.01)
*G06F 9/50* (2006.01)
*G06F 9/38* (2018.01)

(52) U.S. Cl.
CPC ............ *G06F 9/50* (2013.01); *G06F 12/0811* (2013.01); *G06F 12/0815* (2013.01); *G06F 12/0875* (2013.01); *G06F 13/1668* (2013.01); *G06F 13/4022* (2013.01); *G06F 13/4027* (2013.01); *G06F 13/4068* (2013.01); *G06F 13/4282* (2013.01); *G06F 2009/4557* (2013.01); *G06F 2009/45579* (2013.01); *G06F 2009/45595* (2013.01); *G06F 2213/0026* (2013.01); *G06F 2213/0058* (2013.01); *G06F 2213/0064* (2013.01)

(58) Field of Classification Search
CPC .......... G06F 13/4022; G06F 123/4027; G06F 12/0815; G06F 12/0811; G06F 9/3877; G06F 2213/0026; G06F 2213/0058; G06F 2009/4557; G06F 2009/45595
See application file for complete search history.

(56) References Cited

U.S. PATENT DOCUMENTS

2018/0198840 A1* 7/2018 Chandran ............ G06F 9/45533
2019/0034363 A1* 1/2019 Palermo .............. G06F 13/4068

OTHER PUBLICATIONS

Gen-Z Consortium; "Gen-Z Core Specification", (2016-2018); vol. 1; 983 pages.
PCI Express; "PCI Express Base Specification," Feb. 19, 2014; Rev. 4.0, Version 0.3; 1053 pages.
RapidIO; "Interconnect Specification Part 1: Input/Output Logical Specification 4.0," (Jun. 2016); 1495 pages.

* cited by examiner

ACCELERATOR INTERCONNECT ASSIGNMENTS FOR VIRTUAL ENVIRONMENTS

CROSS-REFERENCE TO RELATED APPLICATION(S)

The present application claims priority to U.S. Provisional App. No. 62/553,608, entitled "AUTONOMOUS CAPACITY SCALING FOR VIRTUAL DATA CENTER AND MOBILE NETWORKS" filed on Sep. 1, 2017, which is hereby incorporated by reference in its entirety.

TECHNICAL FIELD

The present disclosure relates to the field of hardware acceleration and virtualization technologies, and in particular, to systems, apparatuses, methods, and storage media for providing virtual machine hardware acceleration.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Data center service providers (DCSPs) continue to embrace virtualization technologies to improve server and infrastructure utilization for running applications. Virtualization technologies have evolved to consolidate physical resources across data center servers into a virtual resource pool. Virtual central processing unit (CPU), input/output (I/O), networking, and storage resources can be used to build resources to support a particular application to maximize server usage. As advances in virtual infrastructure and management techniques continue to evolve (e.g., for use in network function virtualization), virtual switching performance may become a critical factor in determining application performance. Virtual switches route data between applications (e.g., virtual machines) and the network. One challenge is to maintain high data plane throughput and low latency while reducing the impacts of virtual switching on the overall server resources.

Hardware-based solutions may be used to address throughput and latency challenges of virtual switching. However, DCSPs continue to leverage software-based virtual switch solutions that move more of the virtual switching functionality into the server and away from hardware-based solutions located on the network edge. Open virtual switching (OVS) is one example of standard virtual switching implementation for DCSPs, cloud server providers (CSPs), and communication service providers (CoSPs). Along with handling multi-tenant virtual machines (VMs) and/or virtual network function (VNFs) with different resource and latency requirements, the OVS feature-set is evolving to include new capabilities including tunneling, statistics and quality of service (QoS) capabilities. OVS implementations must be able to scale to support increasing network throughput while handling more VMs/VNFs.

Although software-based OVS performance continues to improve, server central CPU usage that is dedicated to OVS features continues to consume a significant percentage of CPU resources that otherwise would be used for applications. Operations such as handling data plane tasks, memory copy, and/or packet table lookup may impact CPU resources, which may cause throughput reduction and increased latency. Additionally, demand for server CPU resources is expected to rise as the demand for data traffic and associated services increases. The adoption of fifth generation (5G) wireless technology may further demand for computing resources as more subscribers and associated mobile data traffic will need to be handled by applications that consume and respond to more sophisticated end-user mobile services.

BRIEF DESCRIPTION OF THE DRAWINGS

The included drawings are for illustrative purposes and serve to provide examples of possible structures and operations for the disclosed embodiments. The drawings in no way limit any changes in form and detail that may be made by one skilled in the art without departing from the spirit and scope of the disclosed concepts.

DETAILED DESCRIPTION

Figure 1:
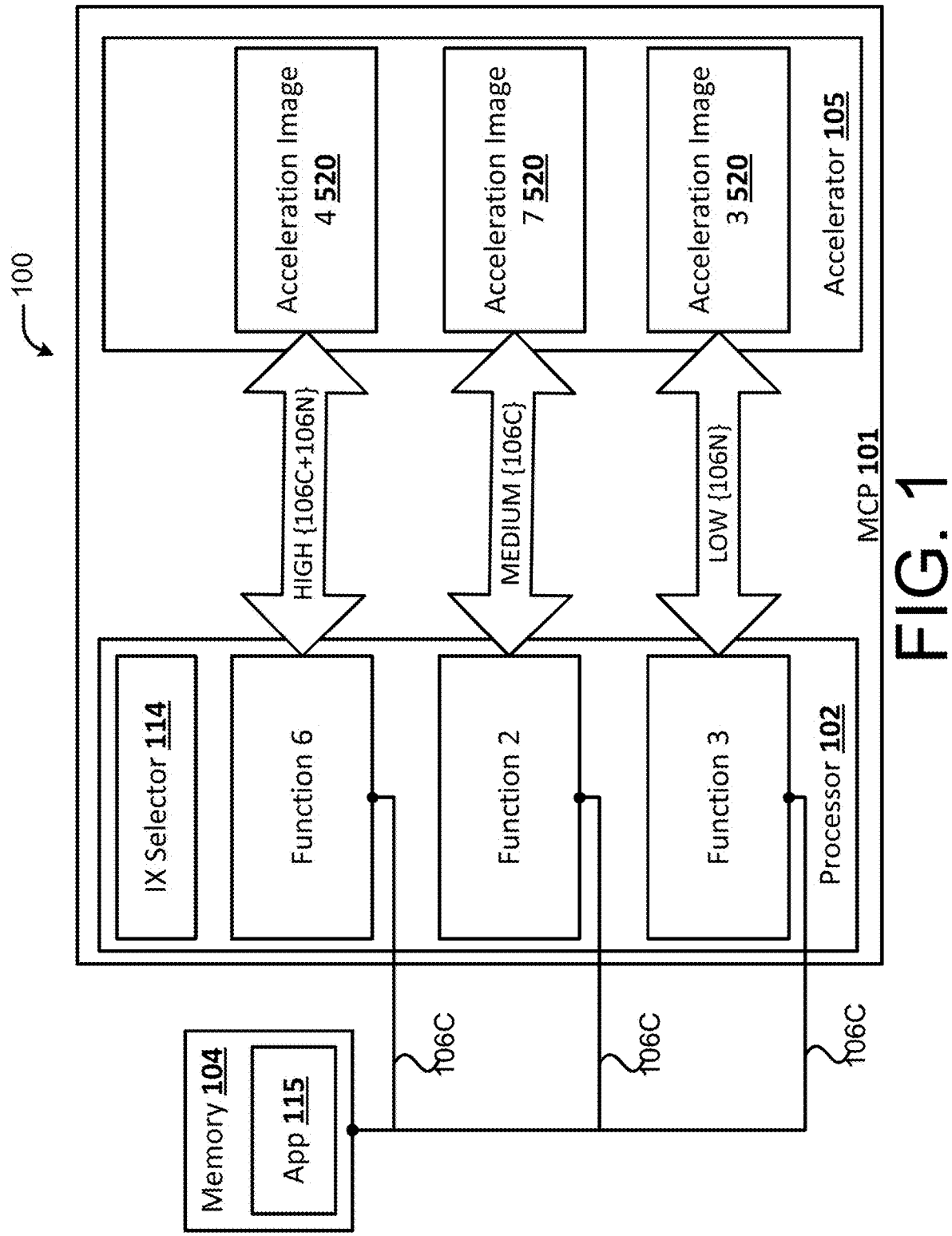
FIG. 1 illustrates an example of interconnect assignments in accordance with various embodiments.

Disclosed embodiments are related to virtual switching technologies. Embodiments herein relate to a processor and hardware acceleration system that extends the processor coherency domain to encompass hardware acceleration that couples multi-processor cache, system memory, accelerator cache, and hardware acceleration to improve or enhance application performance, including cloud and communication applications. Embodiments provide a multi-chip package (MCP) system that includes a processor circuitry coupled with accelerator circuitry via a device interface unit (DIU). The accelerator circuitry may include one or more acceleration function units (AFUs) with a programmable core cache interface (CCI-P) that abstracts physical coherent and physical non-coherent interconnects into virtual channels (VCs) that are coupled to cache (e.g., last level cache) and system memory. The disclosed embodiments include mechanisms to assign VCs to AFUs of individual application workloads based on characteristics including, inter alia, caching hints, data payload side, and interconnect link utilization. In embodiments, full-packet frames may be transferred directly from virtual machines (VMs) executed by processor cores to desired AFUs so that multiple switching actions can happen simultaneously. In this way, the disclosure embodiments allow different VM hardware acceleration performance capabilities to co-exist on the same computer system using interconnect assignments according to workload characteristics.

In various embodiments, VMs may include virtual input/output (vIO or VirtIO) ports, which may be either reception (Rx) vIO ports or transmission (T) vIO ports. The vIO Rx/Tx ports may be bound to a particular interconnect type (e.g., coherent, non-coherent, or a combination thereof). This may allow VMs implemented by the same computing system to have access to different tiers of hardware acceleration capabilities. In particular, the VirtIO embodiments disclosed herein may create pair transceiver (e.g., Rx/Tx) queues that bind to a particular interconnect type (e.g., coherent, non-coherent, or a combination thereof) used to send and receive requests to the physical hardware acceleration resource (e.g., acceleration images implemented by AFUs).

The embodiments herein address latency and throughput challenges facing data center service providers, cloud server providers (CSPs), and communication service providers (CoSPs), by providing virtual networking on servers that can support increased demand for data throughput using standard commercial off the shelf (COTS) computing systems while minimizing the amount of computing resources required to sustain infrastructure overhead.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in various embodiments," "in some embodiments," and the like are used repeatedly. These phrases generally do not refer to the same embodiments; however, they may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine-readable medium, and transmit and receive data from one or more other devices in a communications network. A computer device may be considered synonymous to, and may hereafter be occasionally referred to as, a computer, computing platform, computing device, etc. The term "computer system" may include any type of interconnected electronic devices, computer devices, or components thereof. Additionally, the terms "computer system" and/or "system" may refer to various components of a computer that are communicatively coupled with one another. Furthermore, the terms "computer system" and/or "system" may refer to multiple computer devices and/or multiple computing systems that are communicatively coupled with one another and configured to share computing and/or networking resources. Examples of "computer devices," "computer systems," etc. may include cellular phones or smartphones, feature phones, tablet personal computers, wearable computing devices, autonomous sensors, laptop computers, desktop personal computers, video game consoles, digital media players, handheld messaging devices, personal data assistants, electronic book readers, augmented reality devices, servers (e.g., stand-alone, rack-mounted, blade, etc.), cloud computing services/systems, network elements, in-vehicle infotainment (IVI), in-car entertainment (ICE) devices, an instrument cluster (IC), head-up display (HUD) devices, onboard diagnostic (OBD) devices, dashtop mobile equipment (DME), mobile data terminals (MDTs), electronic engine management system (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a radio access technology (RAT) for the purpose of transmitting and receiving information.

Referring to the figures, FIG. 1 shows an example of interconnect (IX) assignments in accordance with various embodiments. As shown by FIG. 1, a computer system 100 (or "system 100") includes memory 104 and a multi-chip package (MCP) 101. The MCP 101 may include a processor 102 and an accelerator 105. Program code of an application (app) 115 may be stored in the memory 104. The app 115 may comprise various functions including function 6, function 2, and function 3, which may be executed by the processor 102 within a virtual machine (VM) environment. The memory 104 may also store program code for the interconnect (IX) selector 114, which may be executed by the processor 102 to select different coherent IXs 106C or non-coherent IXs 106N between individual functions and specific accelerators (e.g., accelerator 105 loaded with different accelerator images 520 for the different functions). As shown by FIG. 1, the specific accelerators may include acceleration image 4 520, acceleration image 7 520, and acceleration image 3 520.

Assignment of the IXs 106 to a particular function/accelerator may depend on a level or amount of use of a particular function or a workload of the function. A workload may refer to an amount of work performed by an entity during a period of time or at a particular instant of time. A workload may be represented as a benchmark, such as a response time (e.g., the time between a user request and a response to the request from the system 100), throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by the processor 102 during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types. As used herein, the term "workload" may refer to any of the aforementioned workload types or combinations thereof.

As discussed in more detail infra, app 115 may be accelerated by transferring individual functions (or portions thereof) to a particular accelerator image 520. The transfer of individual functions (or portions thereof) to a corresponding accelerator image 520 may be based on an IX assignment (or IX mapping), which indicates one or more coherent IXs 106C and/or one or more non-coherent IXs 106N over which program code, data, etc. are to be transferred. For each function, program code, data, etc. to be transferred to the accelerator 105, a workload of a particular function may be determined, and program code or data of that function may be sent to one or more accelerator function units (AFUs) 420 (see e.g., FIG. 4) or accelerator images 520 over an assigned IX 106 indicated by the IX assignment. Outputs produced by the AFUs 420 or accelerator images 520, based on execution of the program code and/or the input data, may be provided to the function implemented by the processor 102 over the assigned IX 106.

Different IX technologies may be assigned to different functions/accelerators based on needs of a function during execution of the app 115. In embodiments, an initial IX assignment may be used at application boot-up or startup based on anticipated workload demands for a particular function, and the assignment of IXs 106 to functions/accelerators may be adjusted when various workload criteria limits are exceeded for a particular function. These limits may be defined by a workload characteristic policy (WCP), which indicates a set of workload criteria for particular functions of an app 115. The workload criteria may include or indicate thresholds or limits for different types of workloads, such as link utilization or capacity, throughput, response time, latency, jitter, determinism, etc. An example WCP for the functions of app 115 is shown by table 1.

TABLE 1

Example Workload Characteristic Policy

| | Interconnect Capacity | | | |
|---|---|---|---|---|
| Workload/Function | >50 G to | >50 G to | Up to | Accelerator |
| App 115 | 100 G | 10 G | 1 G | Image |
| 1 Function 6 | HIGH | | LOW | 4 |
| 2 Function 2 | MEDIUM | LOW | | 7 |
| 3 Function 3 | | | LOW | 3 |

In table 1, the HIGH classification may indicate to use a combination of a coherent IX 106C and a non-coherent IX 106N, the MEDIUM classification may indicate to use a coherent IX 106C, and the LOW classification may indicate to use a non-coherent IX 106N. Table 1 also shows an association between functions and accelerator images and IX 106 assignments based on function workloads. In the example of table 1, the workloads may be based on IX capacity requirements for transferring data, program code, etc. between a function and corresponding accelerator image, and vice versa.

According to the WCP of table 1, the IX selector 114 may select the HIGH capacity IX 106C+106N when a detected or predicted IX capacity of a link (e.g., a VC 506) between accelerator image 4 and function 6 is between 50 gigabits per second (Gbit/s or G) and 100 G. The IX selector 114 may select the LOW capacity IX 106N when a detected or predicted IX capacity of a link (e.g., a VC 506) between accelerator image 4 and function 6 is less than or equal to 10 G. Additionally, the IX selector 114 may select the MEDIUM capacity IX 106C when a detected or predicted IX capacity of a link (e.g., a VC 506) between accelerator image 7 and function 2 is between 50 G and 100 G, and may select the LOW capacity IX 106C when a detected or predicted IX capacity of a link (e.g., a VC 506) between accelerator image 7 and function 2 is between 10 G and 50 G. Furthermore, the IX selector 114 may select the LOW capacity IX 106C when a detected or predicted IX capacity of a link (e.g., a VC 506) between accelerator image 3 and function 3 is less than or equal to 1 G.

For unlisted workload criteria/requirements (e.g., the empty cells in table 1), the IX selector 114 may select any available IX 106 for transferring data between a function and corresponding accelerator image. Moreover, the IX selector 114 may monitor the usage of each IX 106, and may (re)assign data to one or more other IXs 106 when the capacity of a currently used IX 106 is or is almost full. Additionally, although table 1 shows an example where a single workload criterion is considered for IX assignments, in other embodiments, various combinations of workload criteria may be included in a WCP and used for IX assignments.

Figure 2:
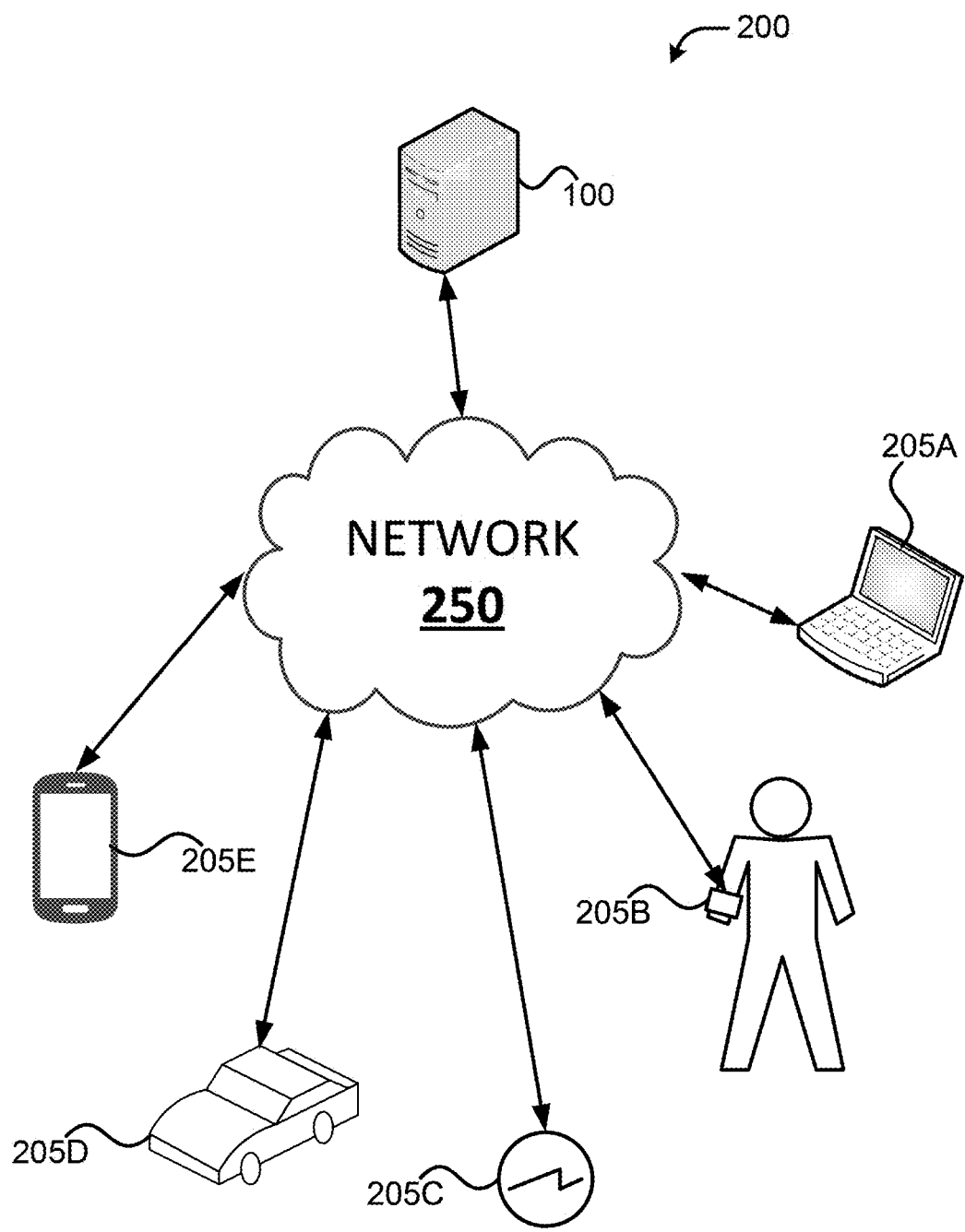
FIG. 2 illustrates an arrangement in which various embodiments may be practiced.

FIG. 2 illustrates an arrangement 200 in which various embodiments may be practiced. Arrangement 200 includes computer system 100 (or "system 100"), network 250, and computer devices 205A-D (collectively referred to as "computer devices 205," "computer device 205" or the like).

The computer devices 205 may be embodied as any type of computation or computer device capable of performing various arithmetic, logical, input/output (I/O) operations, including, without limitation, sending and receiving packets to the system 100 over network 250. In this regard, the computer devices 205 may include processors, memory devices, I/O interfaces, network interface cards, various radio communications devices, and/or other like components. Examples of computer devices 205 may include mobile devices, such as a smartphone (e.g., computer device 205E), a wearable computer device (e.g., computer device 205B), desktop computers, workstations, laptop or notebook computers (e.g., computer device 205A), tablet computers, in-vehicle computing systems (e.g., computer device 205D), Internet of Things (IoT) devices (e.g., computer device 205C), and/or the like. As shown, by FIG. 2, the computer devices 205 are depicted as user, client, or edge computer devices; however, in other embodiments, the computer devices 205 may include wireless access points (e.g., a network switch and/or a network router, a base station, and the like) in a wired or wireless communication network.

Network 250 may comprise computers, network connections among the computers, and software routines to enable communication between the computers over network connections. In this regard, the network 250 may each comprise one or more network elements that may include one or more processors, communications systems (e.g., including network interface controllers, one or more transmitters/receivers connected to one or more antennas, etc.), and computer-readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 250 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 250 may require that the computers execute software routines which enable, for example, the seven layers of the Open System Interconnection (OSI) model of computer networking or equivalent in a wireless (cellular) phone network.

Network 250 may be used to enable relatively long-range communication such as, for example, between the system 100 and the computer devices 205. The network 250 may represent the Internet, one or more cellular networks, a local area network (LAN), a wireless LAN (WLAN), or a wide area network (WAN) including proprietary and/or enterprise networks, or combinations thereof. In some embodiments, the network 250 may be associated with a network operator who owns or controls equipment and other elements necessary to provide network-related services, such as one or more base stations or access points, one or more servers for routing digital data or telephone calls (for example, a core network or backbone network), etc. In some embodiments, the system 100 may be part of the infrastructure that provides network-related services to computer devices 205.

The system 100 may comprise one or more hardware computing devices that provide one or more services to users (e.g., computer devices 205) over a network (e.g., network 250). The system 100 may include one or more processors, one or more memory devices, one or more network interfaces, etc. In various embodiments, the system 100 may be a server (e.g., stand-alone, rack-mounted, blade, etc.) or network appliance (e.g., physical or virtual), In some embodiments, the system 100 may perform the functions of a network element, such as a software router; a software switch; a distributed software switch; a distributed software router; a switched fabric for distributed services; a stand-alone software switch/router or an underline fabric for distributed services in the scope of a network functions virtualization (NFV), and/or a software-defined networking (SDN) architecture. Examples of SDNs may include one or more elements or nodes of an evolved packet core (EPC), a fifth generation (5G) new radio (NR) core network, or the like. An example implementation of the system 100 is shown and described with regard to FIG. 3.

Figure 3:
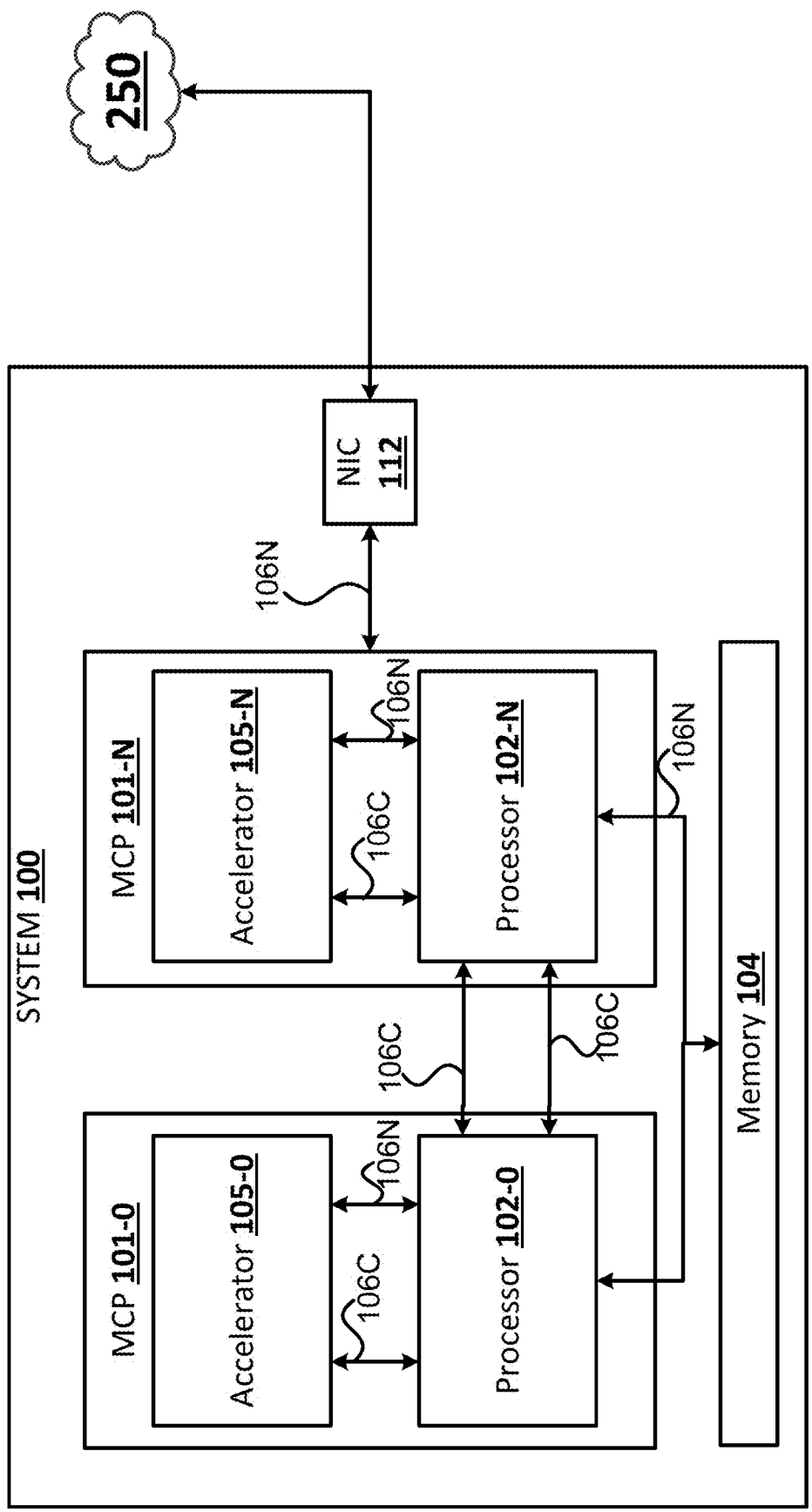
FIG. 3 illustrates an example implementation of a computer system in accordance with various embodiments.

FIG. 3 illustrates an example implementation of a system 100 in accordance with various embodiments. FIG. 3 shows a block diagram of an example of components that may be present in system 100. The system 100 may include any combinations of the components shown by FIG. 3, and the components may be implemented as integrated circuits (ICs) or portions thereof, discrete electronic devices, or other modules, logic, hardware, software, firmware, middleware or a combination thereof adapted in the system 100, or as components otherwise incorporated within a chassis of a larger system. As shown by FIG. 3, the system 100 may include one or more multi-chip packages (MCPs) 101-0 to 101-N (where N is a number), system memory 104, and network interface controller (NIC) 112, each of which may be coupled via interconnect 106C or 106N (collectively referred to as "interconnect 106," "IX 106," or the like).

The MCPs 101 may comprise multiple integrated circuits (ICs), chips, or other like semiconductor devices formed on a single unifying substrate (e.g., a single semiconductor package, a single printed circuit board (PCB), etc.). Each MCP 101 may include a processor 102 and an accelerator 105, which may act in concert to execute program code to carry out various tasks. The following description is provided for example processors 102 and accelerators 105 as being disposed on a single MCP 101; however, the example embodiments are not limited in this regard and the described embodiments may apply to other arrangements that may benefit from the principles described herein, such as where the processors 102 and accelerators 105 resided on respective chips or packages. Each processor 102 (also referred to as "processor circuitry 102") may comprise one or more processing elements configured to perform basic arithmetical, logical, and input/output operations by carrying out instructions. The processor circuitry 102 may be one or more microprocessors, one or more single-core or multi-core processors, one or more multithreaded processors, one or more graphics processing units (GPUs), one or more ultra-low voltage processors, and/or other processors or processing/controlling circuits. As examples, the processor circuitry 102 may include one or more Intel Pentium®, Core®, Atom®, or Xeon®, processors; Advanced Micro Devices (AMD) Accelerated Processing Units (APUs), Epyc®, or Ryzen® processors; and/or the like.

The accelerators 105 may be hardware devices that perform various functions that may be offloaded from an associated processor 102. For example, the accelerators 105 may be used to perform various graphic, cryptographic, packet processing functions, etc., depending on the use or implementation of the system 100. In some embodiments where the system 100 is used for data center, cloud computing, and/or network/communication services, the accelerators 105 may execute virtual networking infrastructure applications, such as open virtual switching (OVS) or the like.

In various embodiments, each accelerator 105 may include circuitry such as, but not limited to, one or more field-programmable devices (FPDs) such as a field-programmable gate array (FPGA); programmable logic devices (PLDs) such as complex PLDs (CPLDs), high-capacity PLDs (HCPLDs), and the like; Application Specific Integrated Circuits (ASICs) such as structured ASICs and the like; programmable system on chips (PSoCs); etc. In some implementations, one or more of the accelerators 105 may be an FPGA image that is turned into a chip, such as an ASIC, for power and efficiency purposes. The circuitry of the accelerators 105 may comprise bitstreams, logic blocks, or logic fabric, memory cells, input/output (I/O) blocks, and other interconnected resources that may be programmed to perform various functions. The memory cells may be used to store data in lookup-tables (LUTs), and may be pre-configured with appropriate logic blocks/fabric to perform some function(s). The memory cells may include any combination of various levels of memory/storage including, but not limited to, erasable programmable read-only memory (EPROM), electrically erasable programmable read-only memory (EEPROM), flash memory, static random access memory (SRAM), anti-fuses, etc.

Memory 104 (also referred to as "memory circuitry 104" or the like) may be circuitry configured to store data, program code, or logic for operating the system 100. Memory circuitry 104 may include a number of memory devices that may be used to provide for a given amount of system memory. As examples, the memory circuitry 104 can be any suitable type, number and/or combination of volatile memory devices (e.g., random access memory (RAM), dynamic RAM (DRAM), SRAM, etc.) and/or non-volatile memory devices (e.g., read-only memory (ROM), EPROM, EEPROM, flash memory, anti-fuses, etc.) that may be configured in any suitable implementation as are known. In various implementations, individual memory devices may be formed of any number of different package types, such as single die package (SDP), dual die package (DDP) or quad die package (Q17P), dual inline memory modules (DIMMs) such as microDlMMs or MiniDIMMs, and/or any other like memory devices. To provide for persistent storage of information such as data, applications, operating systems and so forth, the memory circuitry 104 may include one or more mass-storage devices, such as a solid state disk drive (SSDD); flash memory cards, such as SD cards, microSD cards, xD picture cards, and the like, and USB flash drives; on-die memory or registers associated with the processor circuitry 102 (for example, in low power implementations);

a micro hard disk drive (HDD); three dimensional crosspoint (3D XPOINT) memories from Intel® and Micron®, etc.

The IXs 106C and 106N may include any number (or combination) of interconnect and/or bus technologies used to convey data between processors 102 (e.g., between processor 102-0 and processor 102-N) and between a processor 102 and associated accelerator 105 (e.g., between processor 102-0 and accelerator 105-0). The IX 106C may represent a coherent IX and the IX 106N may represent a non-coherent IX. As used herein, a "coherent" IX may be an interconnect technology used to maintain cache coherence, or to convey shared resource data that ends up stored in multiple local caches. For example, a coherent IX 106C may include Intel® Ultra Path Interface (UPI), Intel® Accelerator Link (IAL), Common Application Programming Interface (CAPI), Intel® QuickPath Interconnect (QPI), or the like. By contrast, a "non-coherent" IX may be an IX technology that may be used without regard to cache coherence. Examples of non-coherent interconnects 106N may include peripheral component interconnect (PCI), PCI express (PCIe), PCI extended (PCIx), or a similar protocol. UPI and PCIe are used as examples throughout the present disclosure, but the embodiments herein should not be construed as limited to using such technologies.

The network interface controller (NIC) 112 may be included to provide a wired communication link to the network 250 and/or other devices. The NIC 112 may include connectors and one or more dedicated processors and/or FPDs to communicate over a wired connection. The wired connection may be an Ethernet connection, token ring, fiber distributed data interface (FDDI), or the like. The connectors may include ports, slots, receptacles, etc. configured to receive a modular connector of a cord or wire. In some embodiments, multiple NICs 112 may be included to allow the system 100 to connect to additional networks (not shown) or other devices. In some implementations, the NIC 112 may be a high-speed serial interface (HSSI) NIC to connect the system 100 to a routing or switching device.

While not shown, various other devices may be present within, or connected to, the system 100. For example, the system 100 may also include input/output (I/O) interface circuitry, such as an external expansion bus (e.g., Universal Serial Bus (USB), FireWire, Thunderbolt, etc.), used to connect system 100 with external (peripheral) components/devices. This circuitry may include any suitable interface controllers and connectors to couple the system 100 with the external components/devices. In another example, I/O devices, such as a display, a touchscreen, or keypad, may be connected to the system 100 to accept input and display outputs.

Figure 4:
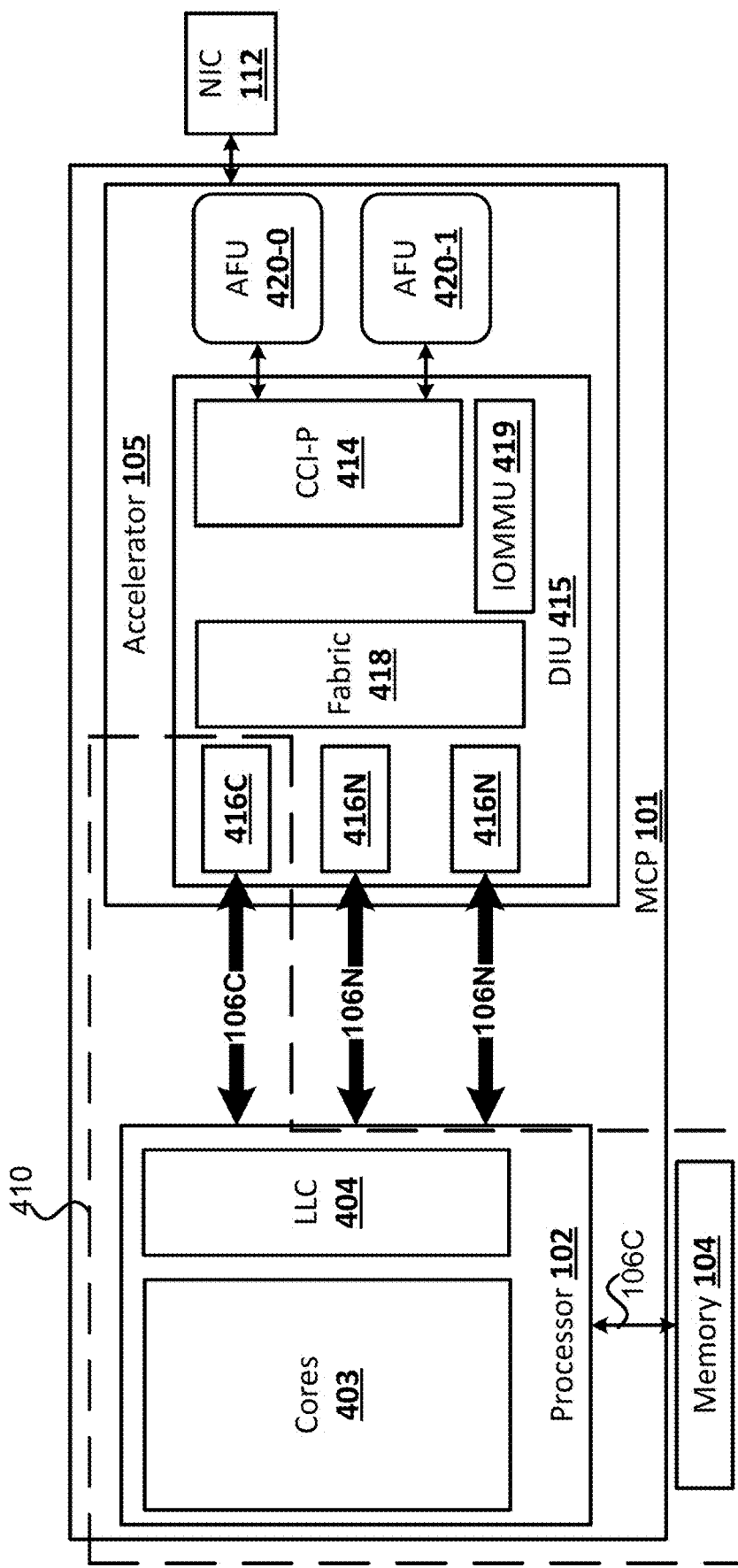
FIG. 4 illustrates an example multi-chip package (MCP) in accordance with various embodiments.

FIG. 4 illustrates example components of an MCP 101 in accordance with various embodiments. As discussed previously, the MCP 101 may include a processor 102 and accelerator 105. The processor 102 may include cores 403 and last level cache (LLC) 404. The accelerator 105 may include a device interface unit (DIU) 415 and accelerator function units (AFUs) 420-0 and 420-1 (collectively referred to as "AFUs 420" or "AFU 420"). In embodiments where the accelerator 105 is an FPD or FPGA device, the DIU 415 may be referred to as an "FPD interface unit," an "FPGA interface unit," an "FIU," or the like. The DIU 415 may include coherent cache 416C, non-coherent cache controllers 416N, fabric 418, programmable core cache interface (CCI-P) 414, and input-output memory management unit (IOMMU) 419.

Referring to the processor 102, each of the cores 403 may be a component that includes two or more processing units that read and execute program code. Each core 403 may include hardware components to fetch and decode instructions, schedule instructions for execution, execute the instructions, fetch data for instruction execution, and store data produced by execution of instructions. The LLC 404 may be embodied as a type of cache memory that the processor 102 can access more quickly than the memory 104 for storing instructions and/or data for execution. The LLC 404 may be the highest-level cache that is called before accessing memory 104. In some embodiments, the LLC 404 may be an on-die cache, while in other embodiments, the LLC 404 may be an off-die cache that resides on the same IC or SoC as the processor 102. Although not shown, the processor circuitry 102 may also comprise level (L)1, L2, or L3.

Referring to the accelerator 105, the DIU 415 may be a device and/or platform code configured at boot time and that remains in memory to manage system buses, whereas the AFUs 420 may be a partial configuration region that may be updated any time after boot-up (e.g., a live system). The DIU 415 may implement various features required for deployment and manageability of the accelerator 105 including interface protocols for links between the processor 102 and accelerator 105. The DIU 415 may also provide platform capabilities, such as Intel® Virtual Technology (Intel® VT) for Directed I/O (Intel® VT-d), security, error monitoring, performance monitoring, power and thermal management, partial reconfiguration of the AFU, etc.

The DIU 415 is coupled to the processor 102 via a physical coherent IX 106C (e.g., UPI) and physical non-coherent IXs 106N. In an example, the coherent IX 106C may be an Intel® UPI interconnect and the non-coherent IXs 106N may be PCIe interconnects. The DIU 415 also extends the coherence domain from the processor 102 to the accelerator 105 to create a Coherence Domain (CD) 410 (represented by the dashed polygon in FIG. 4) that includes accelerator cache 416C, processor 102 cache (including LLC 404), and system memory 104.

The DIU 415 also implements cache controllers 416N and a coherent caching agent (CA) (also represented by item 416C in FIG. 4). The CA may issue read and write requests to the coherent system memory 104 and may service snoop requests to the accelerator cache 416C. The cache controllers 416N may be devices that perform IO transactions, such as providing data, program code, etc. obtained over an IX 106N to an appropriate AFU 420 via CCI-P 414, and providing data, program code, etc. obtained over CCI-P 414 to an appropriate application function over an appropriate IX 106N. In embodiments where IXs 106N are PCIe interconnects, the cache controllers 416N may be PCIe endpoint (EP) devices. The DIU 415 also includes fabric 418, which may be programmable logic blocks that allow other logic blocks to be interconnected to one another. In various implementations, the fabric 418 may comprise logic blocks that allow cache controllers 416C/N and CCI-P 414 to exchange data, program code, etc.

The CCI-P 414 is a hardware-side signaling interface between the AFU(s) 420 and the DIU 415. The CCI-P 414 abstracts the physical links 106C, 106N to the processor 102 and provides simple load/store semantics to the AFU(s) 420 for accessing system memory 104. CCI-P 414 uses data payloads with up to multiple cache lines. The CCI-P 414 provides access to two types of memory, a main memory 104 and an input/output (I/O) memory (not shown). The main memory 104 is the memory attached to the processor 102 and exposed to the operating system and assessable directly from the AFUs 420, whereas the I/O memory requests originate from the AFU(s) 420 using the IOMMU 419 as defined by the CCI-P 414. The IOMMU 419 may broker a direct memory access (DMA) request on behalf of an I/O device in a same or similar manner as a memory management unit (MMU) of processor 102 (not shown) by translating I/O virtual addresses into physical addresses.

The physical coherent IXs 106C and non-coherent IXs 106N are multiplexed as a set of virtual channels (VCs) on the CCI-P interface 414. The physical links are presented as virtual channels on the CCI-P interface 414. An additionally VC, referred to as a virtual automatic channel (VAC), is where the DIU 415 combines or maps acceleration requests to use all physical buses for optimizing for bandwidth. The VAC channel is optimized for maximum workload bandwidth. When choosing the VAC, the DIU 415 VC steering mechanism determines which physical IXs to use based on VAC criteria. VAC criteria may include caching hint(s), data payload size, and link utilization. Caching hints and cacheable requests will be biased towards the coherent (e.g., UPI) IX 106C. Requests with a data payload size of 64B may also be biased towards coherent IX 106C. In some implementations, a cache line may be 64 bytes, and a multi-cache line read/write may not be split between multiple VCs so it is guaranteed to be processed by a single physical link/IX 106. Link utilization may be used to balance the load across all the coherent and non-coherent VCs.

The AFUs 420 may be a partially (re)configurable portion of the accelerator 105. The AFUs 420 may access a unified interface with multiple VCs and a unified memory address space (UAS). The UAS may be coupled to the physical coherent IX 106C and the physical non-coherent IXs 106N. Each AFU 420 may maintain a single view of the system address space. For example, a write to an address X may go to the same cache line in the system memory 104 regardless of whether it travels across the physical coherent IX 106C and/or the physical non-coherent IXs 106N.

Figure 5:
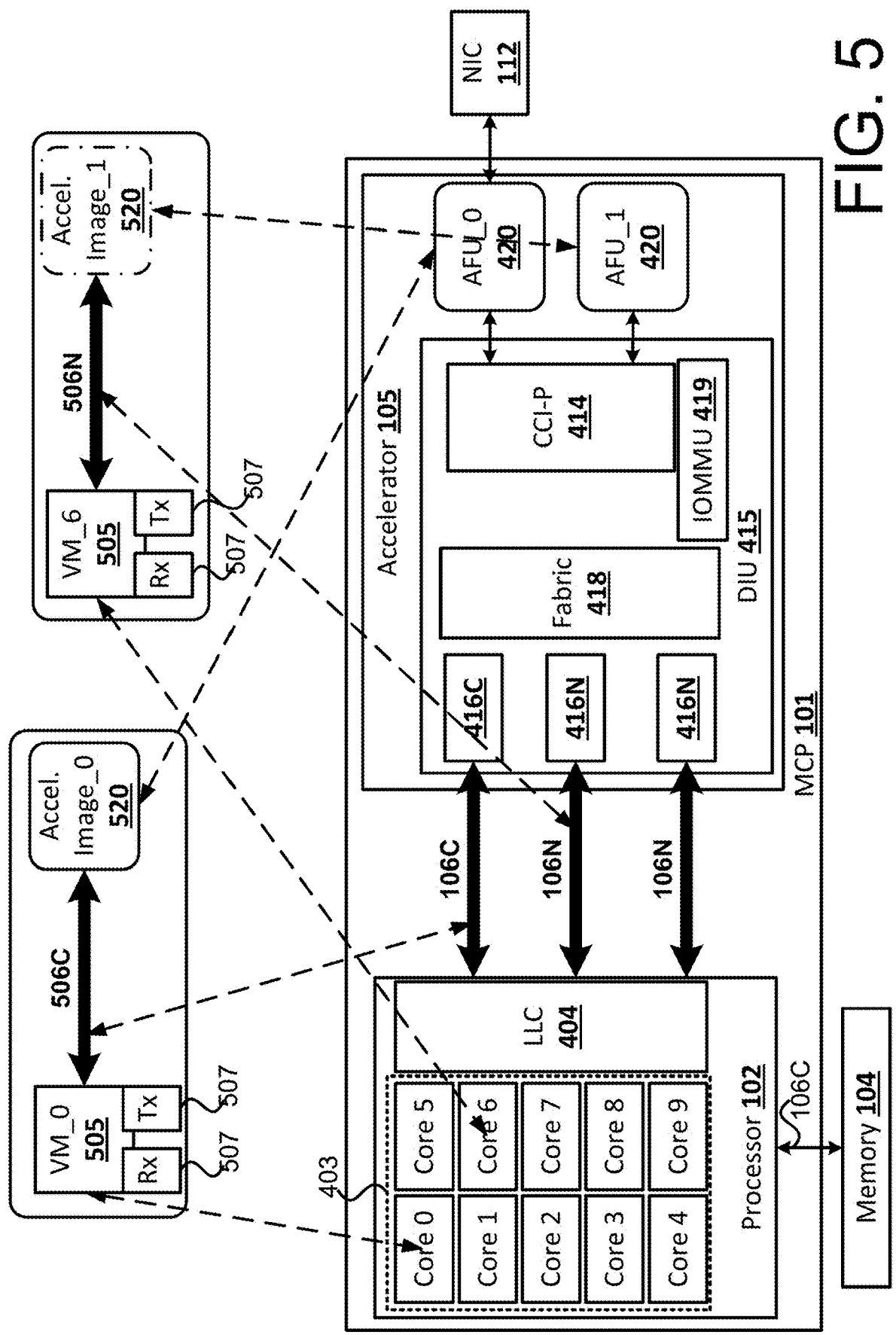
FIG. 5 illustrates example components of an MCP in accordance with various embodiments.

FIG. 5 illustrates example components of MCP 101 in accordance with various embodiments. In the example of FIG. 4, the processor 102 includes ten cores 403 (e.g., cores 0-9), where core 0 503 implements or operates a VM_0 505 and core 6 403 implements/operates a VM_6 505. The VM_0 505 is coupled with an accelerator image_0 520 via a coherent VC 506C, and the VM_6 505 is coupled with an accelerator image_1 520 via a non-coherent VC 506N. In this example, the coherent VC 506C corresponds to the physical coherent IX 106C and the non-coherent VC 506N corresponds to one of the non-coherent IXs 106N.

As shown by FIG. 5, the accelerator image_0 520 may be implemented by the AFU_0 420, and an accelerator image_1 520 may be implemented by the AFU_1 420. The accelerator images 520 may be executable code or files that may be loaded into the AFU to provide acceleration for various function workloads. For example, an AFU engine or developer utility (not shown), when operated by a core 403 of the processor 102, may allow a user or operator to configure the AFUs 420 by providing a development environment, AFU simulation/emulation environments, libraries, drivers, application programming interfaces (APIs), etc. to aid in the development of acceleration programs. The AFU engine/utility may also generate loadable accelerator images 520 based on the developed acceleration programs, and provision the loadable accelerator images 520 into the AFUs 420. The provisioning may include loading the loadable accelerator images 520 being loaded into the memory cells of the accelerator 105.

The loadable accelerator image 520 may comprise bitstreams, logic blocks, logic fabric, etc. and associated metadata. The bitstreams, logic blocks, logic fabric, etc. may be a compiled version of the developed acceleration programs. The metadata may indicate information on AFU 420 characteristics and operational parameters and may be defined in a separate extensible markup language (XML), JavaScript Object Notation (JSON), or other suitable file. As examples, the acceleration programs may be developed or otherwise defined using a hardware description language (HDL), such as register-transfer logic (RTL), very high speed integrated circuit (VHSIC) HDL (VHDL), Verilog, and the like. As an example, the AFU engine/development environment may be the Intel® Open Programmable Acceleration Engine (OPAE) when the processor 102 is an Intel® Xeon® processor.

Each of the VMs 505 may be an application environment that emulates or imitates dedicated hardware devices that provide specific services. For example, the VMs 505 may implement a virtual evolved packet core (vEPC), a virtual customer premise equipment (vCPE), a virtual broadband remote access server (vBRAS), a virtual IP Multimedia Subsystem (vIMS), or the like. In various embodiments, one or more of the VMs 505 may be Virtual Network Functions (VNFs), where multiple VNFs can be chained or linked together to form a multi-step application service that may operate on the same data (e.g., coherent memory).

Each of the VMs 505 may include respective virtual I/O ports (vIOs or VirtIOs) including a vIO input or reception (Rx) port 507 and a vIO output or transmission (Tx) port 507. According to various embodiments the VirtIO Rx/Tx ports 507 may be bound to a particular IX type so that VMs 505 implemented by the same MCP 101 can have access to different tiers of hardware acceleration. As used herein, the terms "binding," "bound," and the like may refer to an association of two or more related elements or objects for a specified amount of time. In embodiments, a binding may allow function workloads to be sent from a VM 505 and to be received by an acceleration image 520 for acceleration of those function workloads.

The bindings may be assigned or established based on workload characteristics of a particular function or workload as defined by a workload characteristic policy. In embodiments, the IX type may be set and bound to a particular VM 505 (or workload) when that VM 505 (or workload) is initialized. In such embodiments, the bindings may be assigned or established based on anticipated workload characteristics. In some embodiments, the IX type may be set and bound to a particular VM 505 (or workload) by a selection module. In such embodiments, the selection module may determine anticipated workload characteristics at VM 505 or application startup and may adjust the IX type bindings based on workload characteristics identified/determined during execution of application functions.

In embodiments, the VirtIO Rx/Tx ports 507 may be bound to a particular hardware acceleration IX type (e.g., coherent, non-coherent) according to the workload characteristics policy. In particular, each of the VirtIO Rx/Tx ports 507 may create queues that bind or become bound to a particular IX type (e.g., coherent, non-coherent, or a coherent and non-coherent) used to send and receive requests to the physical hardware acceleration resource (e.g., acceleration images 520). For example, the VM_0 505 may be an image processing VM application that values determinism. In this example, the VirtIO ports 507 of VM_0 505 may be bound or assigned to VC 506C, which corresponds to the coherent IX 106C. In another example, the VM_6 505 may include a VM application that encrypts data at rest, which typically does not have a determinism requirement. As such, the VirtIO ports 507 of the VM_6 505, at least for the encryption application implemented by the VM_6 505, may be assigned or bound to the VC 506N, which corresponds to the non-coherent IX 106N. The term "determinism" may refer to a requirement that a particular output is produced given a particular input, which may include the underlying modules and/or machine always passing through the same sequence of states. In this way, both the VM for the media processing application and the VM for the data at rest application can co-exist on the same server using different acceleration images.

In various embodiments, VMs 505 may be assigned or bound to a particular accelerator IX according to an accelerator IX assignment (AIXA) procedure. Such an AIXA procedure may include (1) provisioning a new VM 505 with a set of VirtIO ports 507; (2) assigning the VirtIO ports 507 to a particular IX type according to a workload characteristic policy having a predetermined set of workload criteria, such as latency, jitter, determinism, throughput, response time, and/or other like workload criteria, where the IX type may provide coherent and/or non-coherent capabilities; (3) monitoring the assigned IX for usage; and (4) reassigning a new IX type to the VirtIO ports 507 in the event of under- or overutilization of the assigned IX. Additional examples of AIXA procedures are discussed with regard to FIGS. 6-7 infra.

Figure 6:
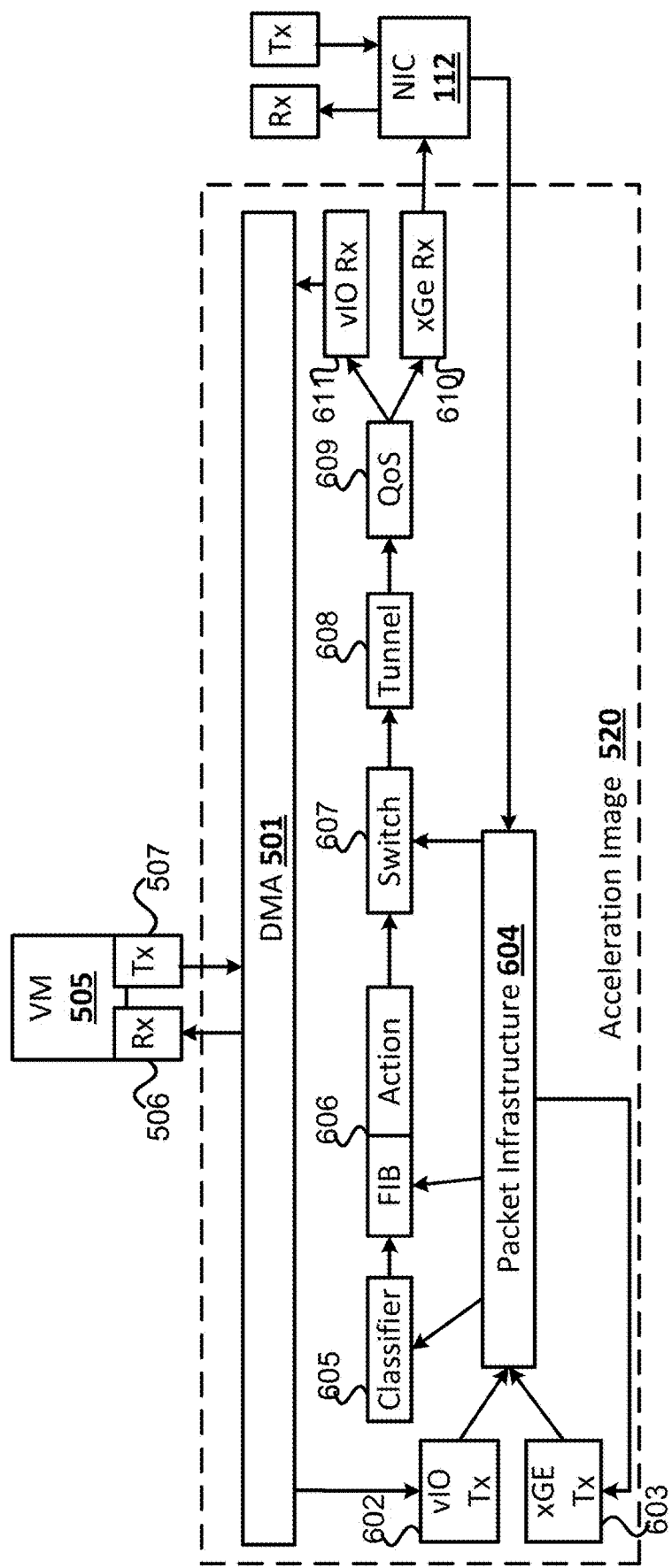
FIG. 6 illustrates an example accelerator image in accordance with various embodiments.

FIG. 6 illustrates an example accelerator image 520 in accordance with various embodiments. In FIG. 6, the accelerator image 520 may be used to accelerate individual functions, sub-functions, tasks, etc. (hereinafter "functions" or "function") of a virtual switch data plane offloading application. To accelerate applications, individual functions may be transferred to a particular accelerator image 520. The functions and/or accelerator images 520 may be assigned to different IXs 106 depending on various workload characteristics of a particular function, such as packet (payload) size, caching hints, IX link utilization, response requirements, latency, throughput, determinism requirements, and the like. In an example, the virtual switch application may be an Open vSwitch (OVS), which is a virtual multi-layer switch (MLS) that provides network switching functionality for VMs and physical devices. Additionally, the virtual switch application may support the OpenFlow protocol to determine data paths for packets, and may support an OVS-Data Plane Development Kit (OVS-DPDK) stack to further optimize performance.

In the example of FIG. 6, the virtual switch application may operate within an environment of the VM 505. Computationally intensive functions/workloads of the virtual switch application may be offloaded to the acceleration platform (e.g., AFU 420), which has low latency and high bandwidth IXs 106 between the processor 102 and the accelerator 105 as discussed previously. The acceleration image 520 may be configured or provisioned within an AFU 420 (not shown by FIG. 5). The acceleration image 520 may be used to accelerate packet processing due to the compute complexity of the virtual switch application. The acceleration image 520 may include a set of accelerator functions, where each accelerator function is coupled to a VC 506 to provide optimum performance for a corresponding function (or portion thereof) of an application. Additionally, the acceleration image 520 may deliver a hardware interface to the virtual switch application to couple with other virtual switch functions so that each accelerator function of the acceleration image 520 can interface with the virtual switch application to handle related packets. As shown by FIG. 5, the set of accelerator functions of the application image 520 may include a Direct Memory Access (DMA) 601, a vIO Tx 602, a 10 Gigabit Ethernet (xGE) Tx 603, a packet infrastructure 604, a classifier 605, a forwarding information base (FIB) lookup 606, a switch 607, a tunnel 608, a QoS 609, an xGE Rx 610, and a vIO Rx 611.

The components of the acceleration image 520 (accelerator functions) may implement acceleration that transports data packets back and forth between VirtIO queues (RX/TX) and the virtual switch application. For instance, the VM_0 505 may transfer full packet frames to the accelerator at the output (Tx) port 507, and the packets may be provided from the output (Tx) port 507 to the DMA 601. The DMA 601 may place the packets into receive buffers of the packet infrastructure 604 via vIO Tx 602 port. To do so, the application image 520 may provide a configuration interface to specify the addresses of the VirtIO queues and mapping tables for memory regions containing packet buffers. Additionally, the DMA 601 may access and parse a VirtIO queues (TX/RX) data structure in the system memory 104 via the CCI-P interface 414.

The packet infrastructure 604 is a common packet caching block, which other blocks/functions interact with to obtain and manipulate packet contents. Packets in the receive buffers may be provided to classifier 605, which may be an OpenFlow tuple parser minus IPv6 Extension headers and Provider Bridge Backbone. The classifier 605 matches each packet to a flow entry in a flow table. The flow entry contains or indicates an action set, which is to be applied to all matched packets at FIB/actions 606. The FIB 606 may be a flow lookup table that includes routing information for a manipulated packet. The routing information may include, for example, a destination node identifier (ID), a destination port ID, group ID, or the like. In some implementations, the FIB 606 may store a mapping of flow IDs to output destination port IDs or the like. Actions 606 govern how a packet is processed, including discard, modify, queue, forward, or other like actions for manipulating packets. In addition to the set actions to apply to a packet, the action set also includes information about the packet, such as arrival port, metadata, and the like. The aforementioned tables may be hash tables built using any suitable hashing scheme, such as cuckoo hash function, a jHash function, or the like.

The switch 607 entity may translate commands from an OVS controller into instructions for the data plane, and internal data plane notifications to be provided to the OVS controller. The switch 607 entity may also perform some packet handling operations based on a data plane configuration. The tunnel 608 may encapsulate the packet according to a tunneling protocol, such as Virtual eXtensible Local Area Network (VxLAN), Generic Routing Encapsulation (GRE), Network Virtualization using GRE (NVGRE), Stateless Transport Tunneling (STT), Generic Network Virtualization Encapsulation (GENEVE), or the like. The particular tunneling protocol to be used may be defined by the data plane configuration.

The QoS 609 entity may perform traffic shaping functions, such as policing (e.g., dropping packets received in excess of the configured rate). The QoS 609 entity may also perform metering, which may include monitoring traffic prior to output, and perform some operation(s) on the packets based on the ingress rate defined for the flow. After the traffic shaping or metering operations, the packets may be provided to the vIO Rx (output) port 611 to be transferred to another VM 505 via DMA 601, or may be provided to an xGe Rx (output) port to be provided to the NIC 112 to be transmitted over network 250. Additionally, packets that are obtained by the NIC 112 from other remote devices may be passed to the packet infrastructure 604, which may be passed to an xGe Tx (input) port 603, and then processed as discussed previously.

In embodiments, an underlying selection module (e.g., IX selector 114 discussed with regard to FIG. 1) may favor coherent link 106C transmission when the read/write size is single cache line, latency sensitive, or the data is intentionally kept in cache 404 because of high spatial locality or temporal locality, for example, a small packet or the flow lookup. When reading large buffers or transmitting large packets from an external Ethernet interface to a VM RX port, the selection module may favor to transmit via a non-coherent link 106N since it can support burst transactions and the latency requirement is not as high as small packets. The selection module may also monitor the usage of each link 106 and may dispatch the traffic to another link 106 when the traffic meets or exceeds link capacity to achieve higher bandwidth.

Figure 7:
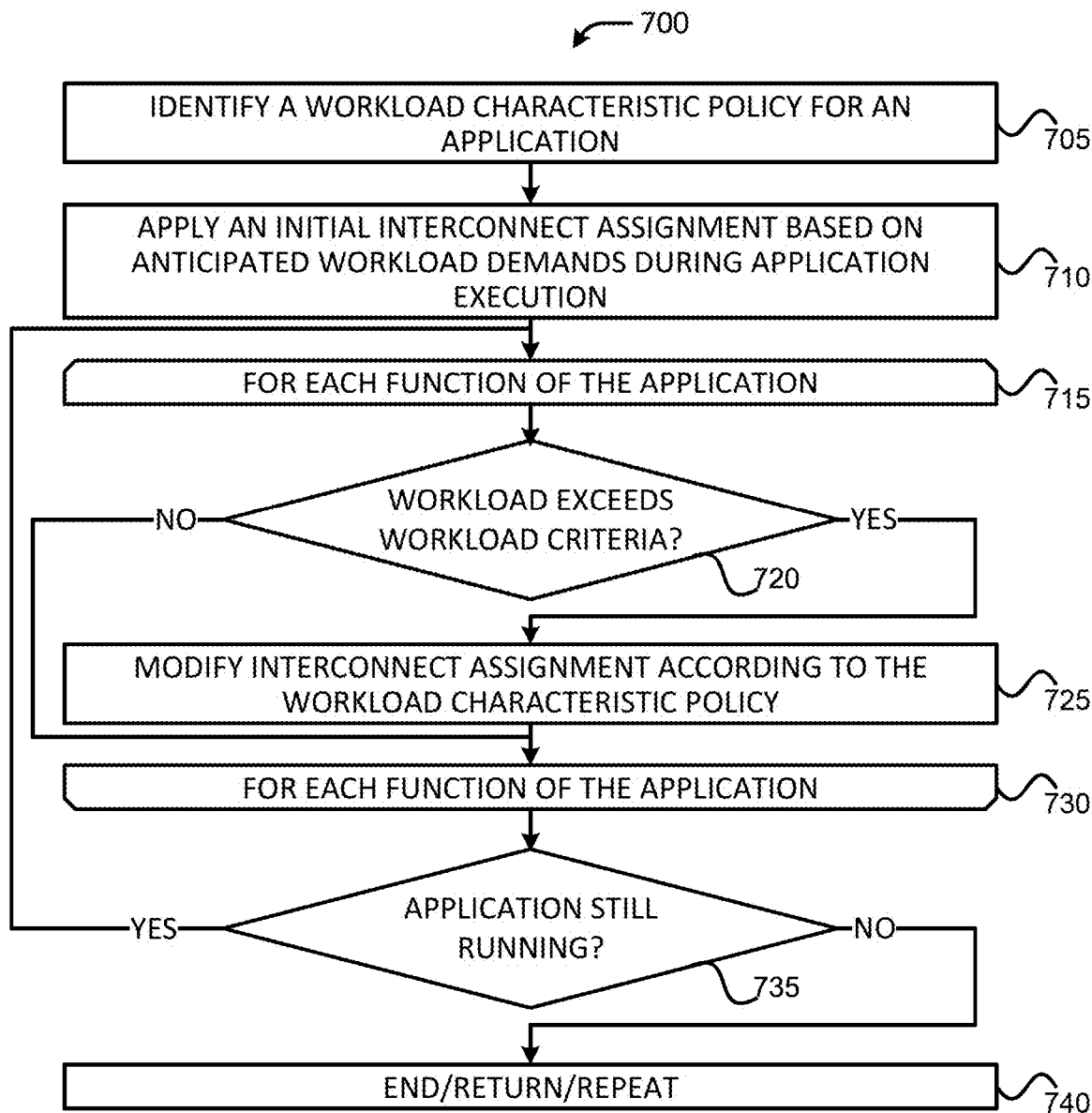
FIG. 7 illustrates an example process for selecting and assigning interconnects in accordance with various embodiments.

FIG. 7 illustrates a process 700 for selecting and assigning IXs in accordance with various embodiments. For illustrative purposes, the operations of process 700 are described as being performed by IX selector 114 of FIG. 1; however, other entities, modules, components, devices (or components thereof) may operate the process 700 in a multitude of implementations, arrangements, and/or environments. Additionally, process 700 may be implemented as program code, which when executed by a processor 102, causes a computer system 100 to perform the various operations of process 700. While particular examples and orders of operations are illustrated by FIG. 7, in various embodiments, these operations may be re-ordered, separated into additional operations, combined, or omitted altogether.

Referring to FIG. 7, process 700 may begin at operation 705 where the IX selector 114 may identify a WCP for an application that is to be executed. At operation 710, during application execution, the IX selector 114 may apply an initial IX assignment for links (e.g., VCs 506) between accelerator images and application functions as defined by the WCP for anticipated workload demands of the VM/application functions. In embodiments, the anticipated workload demands may be based on various predefined application requirements.

At opening loop block 715, the IX selector 114 may process, analyze, or otherwise determine workloads for each function of the application. At operation 720, the IX selector 114 may determine whether a determined workload of a currently analyzed function exceeds workload criteria defined by the WCP for the currently analyzed function.

If at operation 720 the IX selector 114 determines that the workload criteria is not exceeded for the currently analyzed function, then the IX selector 114 may proceed to operation 730 to iterate back to opening loop block 715 to process/analyze a next function, if any. If at operation 720 the IX selector 114 determines that the workload criteria is exceeded for the currently analyzed function, then the IX selector 114 may proceed to operation 725 to modify the IX assignment according to the WCP. After operation 725, the IX selector 114 may proceed to closing loop operation 730 to iterate back to opening loop block 715 to process/analyze a next function, if any.

Once all functions have been processed/analyzed, the IX selector 114 may proceed to operation 735 to determine whether the application is still running/executing. If at operation 735 the IX selector 114 determines that the application is still running/executing, then the IX selector 114 may proceed back to operation 715 to re-analyze/process the application functions for workload characteristics. If at operation 735 the IX selector 114 determines that the application is no longer running/executing, then the IX selector 114 may proceed to operation 740 to end or repeat the process 700.

Some non-limiting examples are as follows. The following examples pertain to further embodiments, and specifics in the examples may be used anywhere in one or more embodiments discussed previously. Any of the following examples may be combined with any other example, or any embodiment discussed herein.

Example 1 may include a multi-chip package (MCP) to be employed in a computer system, the MCP comprising: multi-core processor circuitry comprising a plurality of processing cores, wherein one or more processing cores of the plurality of processing cores are to implement virtual machines (VMs); and hardware accelerator circuitry coupled with the multi-core processor circuitry via one or more coherent interconnects (IXs) and one or more non-coherent IXs, wherein individual coherent IXs of the one or more coherent IXs and individual non-coherent IXs of the one or more non-coherent IXs are bound to individual VMs based on workload characteristics of application functions of an application to be executed in the individual VMs.

Example 2 may include the MCP of example 1 and/or some other examples herein, wherein the computer system comprises: system memory circuitry coupled with the multi-core processor circuitry; and a coherency domain, wherein the coherency domain comprises the system memory, last level cache (LLC) circuitry of the multi-core processor circuitry, the one or more coherent IXs, and cache circuitry of the hardware accelerator circuitry.

Example 3 may include the MCP of examples 1-2 and/or some other examples herein, wherein the individual VMs comprise a set of virtual input/output (vIO) ports, wherein each vIO port of the set of vIO ports is bound to a coherent IX of the one or more coherent IXs or a non-coherent IX of the one or more non-coherent IXs according to a workload characteristic policy, wherein the workload characteristic policy is to define a set of workload criteria for individual application functions of the application.

Example 4 may include the MCP of example 3 and/or some other examples herein, wherein the hardware accelerator circuitry comprises: device interface unit (DIU) circuitry; and accelerated function unit (AFU) circuitry coupled with the DIU circuitry via programmable core cache interface (CCI-P) circuitry, wherein the AFU circuitry comprises one or more memory cells to be loaded with an accelerator image of a plurality of accelerator images.

Example 5 may include the MCP of example 4 and/or some other examples herein, wherein the CCI-P circuitry is to abstract the one or more coherent IXs and the one or more non-coherent IXs into individual virtual channels (VCs), wherein the individual VCs are to communicatively couple the individual application functions to individual accelerator functions of a plurality of accelerator functions.

Example 6 may include the MCP of example 5 and/or some other examples herein, wherein an individual processing core of the plurality of processing cores is to implement an IX selection module to: select individual coherent IXs and individual non-coherent IXs to be bound to corresponding ones of the individual VMs, wherein, to select the individual coherent IXs or the individual non-coherent IXs, the IX selection module is to: assign the one or more coherent IXs and the one or more non-coherent IXs to corresponding ones of the individual VCs based on current workload characteristics and the workload characteristic policy.

Example 7 may include the MCP of examples 1-6 and/or some other examples herein, wherein, to select an individual coherent IX or an individual non-coherent IX, the IX selection module is to: select, as an initial IX before execution of an application function of the application, one of the individual coherent IX or the individual non-coherent IX based on an anticipated workload of the application function, wherein the anticipated workload is based on application requirements; and select another IX of the one or more coherent IXs or the one or more non-coherent IXs when current workload characteristics of the application function exceed a threshold defined by the application requirements.

Example 8 may include the MCP of examples 4-7 and/or some other examples herein, wherein the DIU circuitry is to: implement interface protocols for the one or more coherent IXs and the one or more non-coherent IXs; and exchange information between an operator platform and the AFU circuitry, wherein the information comprises security information, error monitoring information, performance monitoring information, power and thermal management information, and AFU configuration information.

Example 9 may include the MCP of examples 4-8 and/or some other examples herein, wherein the DIU circuitry comprises: DIU cache; one or more non-coherent cache controllers corresponding to the one or more non-coherent IXs; one or more coherent cache controllers corresponding to the one or more coherent IXs, and wherein the one or more coherent cache controllers are to issue read and write requests to a coherent system memory of the computer system and perform bus snooping operations on the DIU cache.

Example 10 may include the MCP of examples 1-9 and/or some other examples herein, wherein: the one or more coherent IXs are Intel® Ultra Path Interface (UPI) IXs, Intel® Accelerator Link (IAL) IXs, or Common Application Programming Interface (CAPI) IXs; the one or more non-coherent IXs are peripheral component interconnect express (PCIe) IXs; and the hardware accelerator circuitry is a field programmable gate array (FPGA).

Example 11 may include a computer system, comprising: one or more network interface controllers (NICs); system memory circuitry; and one or more multi-chip packages (MCPs) communicatively coupled to one another and communicatively coupled with the system memory circuitry, wherein at least one MCP of the one or more MCPs is communicatively coupled with the one or more NICs, and wherein each MCP of the one or more MCPs comprises: multi-core processor circuitry comprising a plurality of processing cores, wherein one or more processing cores of the plurality of processing cores are to implement individual virtual machines (VMs); hardware accelerator circuitry coupled with the multi-core processor circuitry via one or more coherent interconnects (IXs) and one or more non-coherent IXs; and a coherency domain, wherein the coherency domain comprises the system memory, last level cache (LLC) circuitry of the multi-core processor circuitry, the one or more coherent IXs, and cache circuitry of the hardware accelerator circuitry, and wherein individual coherent IXs of the one or more coherent IXs and individual non-coherent IXs of the one or more non-coherent IXs are bound to individual VMs based on workload characteristics of application functions of an application to be executed in the individual VMs.

Example 12 may include the computer system of example 11 and/or some other examples herein, wherein the individual VMs comprise a set of virtual input/output (vIO) ports, wherein each vIO port of the set of vIO ports is bound to a coherent IX of the one or more coherent IXs or a non-coherent IX of the one or more non-coherent IXs according to a workload characteristic policy, wherein the workload characteristic policy is to define a set of workload criteria for individual application functions of the application.

Example 13 may include the computer system of example 12 and/or some other examples herein, wherein the hardware accelerator circuitry comprises: device interface unit (DIU) circuitry; and accelerated function unit (AFU) circuitry coupled with the DIU circuitry via programmable core cache interface (CCI-P) circuitry, wherein the AFU circuitry comprises one or more memory cells to be loaded with an accelerator image of a plurality of accelerator images.

Example 14 may include the computer system of example 13 and/or some other examples herein, wherein an individual processing core of the plurality of processing cores is to implement an IX selection module to: select individual coherent IXs and individual non-coherent IXs to be bound to corresponding ones of the individual VMs Example 15 may include the computer system of example 14 and/or some other examples herein, wherein the CCI-P circuitry is to abstract the one or more coherent IXs and the one or more non-coherent IXs into individual virtual channels (VCs), wherein the individual VCs are to communicatively couple the individual application functions to individual accelerator functions of a plurality of accelerator functions.

Example 16 may include the computer system of example 15 and/or some other examples herein, wherein, to select individual coherent IXs and individual non-coherent IXs, the IX selection module is to: assign the one or more coherent IXs and the one or more non-coherent IXs to corresponding ones of the individual VCs based on current workload characteristics and the workload characteristic policy.

Example 17 may include the computer system of examples 15-16 and/or some other examples herein, wherein, to select individual coherent IXs and individual non-coherent IXs, the IX selection module is to: select, as an initial IX before execution of an application function of the application, one of the individual coherent IX or the individual non-coherent IX based on an anticipated workload of the application function, wherein the anticipated workload is based on application requirements; and select another IX of the one or more coherent IXs or the one or more non-coherent IXs when current workload characteristics of the application function exceed a threshold defined by the application requirements.

Example 18 may include the computer system of examples 13-17 and/or some other examples herein, wherein the DIU circuitry is to: implement interface protocols for the one or more coherent IXs and the one or more non-coherent IXs; and exchange information between an operator platform and the AFU circuitry, wherein the information comprises security information, error monitoring information, performance monitoring information, power and thermal management information, and AFU configuration information.

Example 19 may include the computer system of examples 13-18, wherein the DIU circuitry comprises: DIU cache; one or more non-coherent cache controllers corresponding to the one or more non-coherent IXs; one or more coherent cache controllers corresponding to the one or more coherent IXs, and wherein the one or more coherent cache controllers are to issue read and write requests to a coherent system memory of the computer system and perform bus snooping operations on the DIU cache.

Example 20 may include the computer system of examples 11-19 and/or some other examples herein, wherein: the one or more coherent IXs are Intel® Ultra Path Interface (UPI) IXs, Intel® Accelerator Link (IAL) IXs, or Common Application Programming Interface (CAPI) IXs; the one or more non-coherent IXs are peripheral component interconnect express (PCIe) IXs; and the hardware accelerator circuitry is a field programmable gate array (FPGA).

Example 21 may include one or more computer-readable media (CRM) comprising instructions, which when executed by one or more processor cores of a multi-core processor, is to cause the multi-core processor to: control operation of individual virtual machines (VMs), wherein one or more applications are to be executed in the individual VMs; and determine an interconnect (IX) assignment, the IX assignment to indicate one or more coherent IXs and one or more non-coherent IXs over which workloads are to be transferred, and wherein the one or more coherent IXs and the one or more non-coherent IXs are to communicatively couple the multi-core processor with a hardware accelerator, and for each application function of the one or more applications: identify workloads of an application function, send, over an assigned IX indicated by the IX assignment, program code or data of the application function to one or more acceleration function units (AFUs) of the hardware accelerator, and obtain, over the assigned IX, outputs produced by the one or more AFUs based on execution of the program code or the data.

Example 22 may include the one or more CRM of example 21 and/or some other examples herein, wherein, to determine the IX assignment, execution of the instructions is to cause the multi-core processor to: control operation of an IX selection module to select an individual coherent IX of the one or more coherent IXs or an individual non-coherent IX of one or more non-coherent IXs.

Example 23 may include the one or more CRM of example 22 and/or some other examples herein, wherein, to select the individual coherent IX or the individual non-coherent IX, execution of the instructions is to cause the multi-core processor to control operation of the IX selection module to: identify a workload characteristic policy (WCP) associated with an individual application of the one or more applications, wherein the WCP is to define a set of workload criteria for application functions of the individual application; and select, for each application function of the individual application before execution of the individual application, the individual coherent IX or the individual non-coherent IX having workload criteria that corresponds with anticipated workload characteristic of the application function.

Example 24 may include the one or more CRM of example 23 and/or some other examples herein, wherein execution of the instructions is to cause the multi-core processor to control operation of the IX selection module to: select, for each application function of the individual application during execution of the individual application, another individual coherent IX or another individual non-coherent IX having workload criteria that corresponds with current workload characteristics when the current workload characteristics exceed workload criteria of a currently assigned IX as indicated by the WCP.

Example 25 may include the one or more CRM of examples 21-24 and/or some other examples herein, wherein the IX assignment is based on virtual channels (VCs) that correspond to the one or more coherent IXs and the one or more non-coherent IXs, wherein individual VCs are to communicatively couple individual application functions to individual accelerator functions of a plurality of accelerator functions implemented by the hardware accelerator.

Example 26 may include the one or more CRM of example 25 and/or some other examples herein, wherein the hardware accelerator comprises: a device interface unit (DIU); and one or more accelerated function units (AFUs) coupled with the DIU via a programmable core cache interface (CCI-P), wherein the one or more AFUs comprise one or more memory cells to be loaded with an accelerator image of a plurality of accelerator images, and wherein the CCI-P circuitry is to abstract the one or more coherent IXs and the one or more non-coherent IXs into individual VCs.

Example 27 may include the one or more CRM of example 26 and/or some other examples herein, wherein execution of the instructions is to cause the multi-core processor to control operation of the IX selection module to: assign the one or more coherent IXs and the one or more non-coherent IXs to corresponding ones of the individual VCs based on current workload characteristics and the WCP.

Example 28 may include the one or more CRM of examples 26-27 and/or some other examples herein, wherein the DIU is to: implement interface protocols for the one or more coherent IXs and the one or more non-coherent IXs; and exchange information between an operator platform and the AFU, wherein the information comprises security information, error monitoring information, performance monitoring information, power and thermal management information, and AFU configuration information.

Example 29 may include the one or more CRM of examples 26-28 and/or some other examples herein, wherein the DIU circuitry comprises: DIU cache; one or more non-coherent cache controllers corresponding to the one or more non-coherent IXs; one or more coherent cache controllers corresponding to the one or more coherent IXs, and wherein the one or more coherent cache controllers are to issue read and write requests to a coherent system memory and perform bus snooping operations on the DIU cache.

Example 30 may include the one or more CRM of examples 21-29 and/or some other examples herein, wherein: the one or more coherent IXs are Intel® Ultra Path Interface (UPI) IXs, Intel® Accelerator Link (IAL) IXs, or Common Application Programming Interface (CAPI) IXs; the one or more non-coherent IXs are peripheral component interconnect express (PCIe) IXs; and the hardware accelerator is a field programmable gate array (FPGA).

Example 31 may include an apparatus to be employed in a computer system, the apparatus comprising: processing means communicatively coupled with hardware acceleration means via one or more coherent interconnects (IXs) and one or more non-coherent IXs, wherein the processing means comprises: virtual machine (VM) means for operating individual VMs, wherein one or more applications are to be executed in the individual VMs; IX selection means for determining an IX assignment, the IX assignment to indicate one or more coherent IXs and one or more non-coherent IXs over which workloads are to be transferred, and for each application function of the one or more applications identifying workloads of an application function; and IX transfer means for sending, over an assigned IX indicated by the IX assignment, program code or data of the application function to one or more acceleration function units (AFUs) of a hardware accelerator, and for obtaining, over the assigned IX, outputs produced by the one or more AFUs based on execution of the program code or the data.

Example 32 may include the apparatus of example 31 and/or some other examples herein, wherein the IX selection means is for selecting an individual coherent IX of the one or more coherent IXs or an individual non-coherent IX of the one or more non-coherent IXs.

Example 33 may include the apparatus of example 32 and/or some other examples herein, wherein, to select the individual coherent IX or the individual non-coherent IX, the IX selection means is for: identifying a workload characteristic policy (WCP) associated with an individual application of the one or more applications, wherein the WCP is to define a set of workload criteria for application functions of the individual application; and selecting, for each application function of the individual application before execution of the individual application, the individual coherent IX or the individual non-coherent IX having workload criteria that corresponds with anticipated workload characteristics of the application function.

Example 34 may include the apparatus of example 33 and/or some other examples herein, wherein the IX selection means is for selecting, for each application function of the individual application during execution of the individual application, another individual coherent IX or another individual non-coherent IX having workload criteria that corresponds with current workload characteristics when the current workload characteristics exceed workload criteria of a currently assigned IX as indicated by the WCP.

Example 35 may include the apparatus of examples 31-34 and/or some other examples herein, wherein the IX assignment is based on virtual channels (VCs) that correspond to the one or more coherent IXs and the one or more non-coherent IXs, wherein individual VCs are to communicatively couple individual application functions to individual accelerator functions of a plurality of accelerator functions implemented by the hardware acceleration means.

Example 36 may include the apparatus of example 35 and/or some other examples herein, wherein the hardware acceleration means comprises: device interface means for communicating program code and data among the processing means and the hardware acceleration means; and acceleration function means coupled with the device interface means via core cache interface means, wherein the acceleration function means comprises storage means for storing acceleration images of a plurality of acceleration images, and wherein the core cache interface means is for abstracting the one or more coherent IXs and the one or more non-coherent IXs into individual VCs.

Example 37 may include the apparatus of example 36 and/or some other examples herein, wherein the IX selection means is for assigning the one or more coherent IXs and the one or more non-coherent IXs to corresponding ones of the individual VCs based on current workload characteristics and the WCP.

Example 38 may include the apparatus of examples 36-37 and/or some other examples herein, wherein the device interface means is for: implementing interface protocols for the one or more coherent IXs and the one or more non-coherent IXs; and exchanging information between an operator platform and the acceleration function means, wherein the information to be exchanged comprises security information, error monitoring information, performance monitoring information, power and thermal management information, and AFU configuration information.

Example 39 may include the apparatus of examples 36-38 and/or some other examples herein, wherein the device interface means comprises: non-coherent cache control means corresponding to the one or more non-coherent IXs; and coherent cache control means corresponding to the one or more coherent IXs, wherein the coherent cache control means is for issuing read and write requests to a coherent system storage means, and for performing bus snooping operations on device interface caching means.

Example 40 may include the apparatus of examples 31-39 and/or some other examples herein, further comprising: coherency domain means comprising system memory means, last level cache (LLC) means of the processing means, the one or more coherent IXs, and cache means of the hardware acceleration means; and network communication means communicatively coupled with the hardware acceleration means, the network communication means is for communicating data over a network, and wherein the one or more coherent IXs are Intel® Ultra Path Interface (UPI) IXs, Intel® Accelerator Link (IAL) IXs, or Common Application Programming Interface (CAPI) IXs; the one or more non-coherent IXs are peripheral component interconnect express (PCIe) IXs; and the hardware acceleration means is a field programmable gate array (FPGA).

Example 41 may include an apparatus to be employed in a computer system, the apparatus comprising: multi-core processor circuitry comprising a plurality of processing cores, wherein one or more processing cores of the plurality of processing cores are to implement virtual machines (VMs); and hardware accelerator circuitry coupled with the multi-core processor circuitry via one or more coherent interconnects (IXs) and one or more non-coherent IXs, wherein individual coherent IXs of the one or more coherent IXs and individual non-coherent IXs of the one or more non-coherent IXs are bound to individual VMs based on workload characteristics of application functions of an application to be executed in the individual VMs, and wherein the multi-core processor circuitry and the hardware accelerator circuitry are implemented as a single semiconductor package, or the multi-core processor circuitry and the hardware accelerator circuitry are implemented as separate semiconductor packages.

Example 42 may include the apparatus of example 41 and/or some other examples herein, wherein the computer system comprises: system memory circuitry coupled with the multi-core processor circuitry; a coherency domain, wherein the coherency domain comprises the system memory, last level cache (LLC) circuitry of the multi-core processor circuitry, the one or more coherent IXs, and cache circuitry of the hardware accelerator circuitry; and one or more network interface controllers (NICs) communicatively coupled with the hardware accelerator circuitry.

Example 43 may include the apparatus of examples 41-42 and/or some other examples herein, wherein the individual VMs comprise a set of virtual input/output (vIO) ports, wherein each vIO port of the set of vIO ports is bound to a coherent IX of the one or more coherent IXs or a non-coherent IX of the one or more non-coherent IXs according to a workload characteristic policy, wherein the workload characteristic policy is to define a set of workload criteria for individual application functions of the application.

Example 44 may include the apparatus of example 43 and/or some other examples herein, wherein the hardware accelerator circuitry comprises: device interface unit (DIU) circuitry; and accelerated function unit (AFU) circuitry coupled with the DIU circuitry via programmable core cache interface (CCI-P) circuitry, wherein the AFU circuitry comprises one or more memory cells to be loaded with an accelerator image of a plurality of accelerator images.

Example 45 may include the apparatus of example 44 and/or some other examples herein, wherein the CCI-P circuitry is to abstract the one or more coherent IXs and the one or more non-coherent IXs into individual virtual channels (VCs), wherein the individual VCs are to communicatively couple the individual application functions to individual accelerator functions of a plurality of accelerator functions.

Example 46 may include the apparatus of example 45 and/or some other examples herein, wherein an individual processing core of the plurality of processing cores is to implement an IX selection module to: select individual coherent IXs and individual non-coherent IXs to be bound to corresponding ones of the individual VMs, wherein, to select the individual coherent IXs or the individual non-coherent IXs, the IX selection module is to: assign the one or more coherent IXs and the one or more non-coherent IXs to corresponding ones of the individual VCs based on current workload characteristics and the workload characteristic policy.

Example 47 may include the apparatus of examples 41-46 and/or some other examples herein, wherein, to select an individual coherent IX or an individual non-coherent IX, the IX selection module is to: select, as an initial IX before execution of an application function of the application, one of the individual coherent IX or the individual non-coherent IX based on an anticipated workload of the application function, wherein the anticipated workload is based on application requirements; and select another IX of the one or more coherent IXs or the one or more non-coherent IXs when current workload characteristics of the application function exceed a threshold defined by the application requirements.

Example 48 may include the apparatus of examples 44-47 and/or some other examples herein, wherein the DIU circuitry is to: implement interface protocols for the one or more coherent IXs and the one or more non-coherent IXs; and exchange information between an operator platform and the AFU circuitry, wherein the information comprises security information, error monitoring information, performance monitoring information, power and thermal management information, and AFU configuration information.

Example 49 may include the apparatus of examples 44-48 and/or some other examples herein, wherein the DIU circuitry comprises: DIU cache; one or more non-coherent cache controllers corresponding to the one or more non-coherent IXs; one or more coherent cache controllers corresponding to the one or more coherent IXs, and wherein the one or more coherent cache controllers are to issue read and write requests to a coherent system memory of the computer system and perform bus snooping operations on the DIU cache.

Example 50 may include the apparatus of examples 41-49 and/or some other examples herein, wherein: the one or more coherent IXs are Intel® Ultra Path Interface (UPI) IXs, Intel® Accelerator Link (IAL) IXs, or Common Application Programming Interface (CAPI) IXs; the one or more non-coherent IXs are peripheral component interconnect express (PCIe) IXs; and the hardware accelerator circuitry is a field programmable gate array (FPGA).

Example 51 may include an apparatus comprising: processor means for operating one or more virtual machines (VMs); acceleration means coupled with the processor means via coherent connection means (CCM) and non-coherent connection means (NCM), wherein the CCM and the NCM are bound to individual VMs based on workload characteristics of application functions of an application to be executed in the individual VMs; and system memory means coupled with the processor means, the system memory means for storing system data; coherency domain means comprising the system memory means, last level caching (LLC) means of the processor means, the CCM, and caching means of the acceleration means; and network communication means communicatively coupled with the acceleration means, wherein the network communication means is for communicating data over a network.

Example 52 may include the apparatus of example 51 and/or some other examples herein, wherein the processor means and the acceleration means are disposed in or on a single semiconductor package, or the processor means and the acceleration means are disposed in or on separate semiconductor packages.

Example 53 may include the apparatus of examples 51-52 and/or some other examples herein, wherein the individual VMs comprise a set of virtual input/output (vIO) ports, wherein each vIO port of the set of vIO ports is bound the CCM or the NCM according to a workload characteristic policy, wherein the workload characteristic policy is to define a set of workload criteria for individual application functions of the application.

Example 54 may include the apparatus of example 53 and/or some other examples herein, wherein the acceleration means comprises: device interface means (DIM); and accelerated function means (AFM) coupled with the DIM via core cache interface means (CCIM), wherein the AFM comprises one or more storage means for being loaded with an accelerator image of a plurality of accelerator images.

Example 55 may include the apparatus of example 54 and/or some other examples herein, wherein the CCIM is for abstracting CCMs and NCMs into individual virtual channels (VCs), wherein the individual VCs are to communicatively couple the individual application functions to individual accelerator functions of a plurality of accelerator functions.

Example 56 may include the apparatus of example 55 and/or some other examples herein, wherein the processor means comprises interconnect selection means for: selecting the CCM or the NCM to be bound to corresponding ones of the individual VMs, wherein selecting the CCM or the NCM, the interconnect selection means is for: assigning the CCM or the NCM to corresponding ones of the individual VCs based on current workload characteristics and the workload characteristic policy.

Example 57 may include the apparatus of examples 51-56 and/or some other examples herein, wherein selecting the CCM or the NCM, the interconnect selection means is for: selecting, as an initial interconnect before execution of an application function of the application, the CCM or the NCM based on an anticipated workload of the application function, wherein the anticipated workload is based on application requirements; and selecting another CCM or another NCM when current workload characteristics of the application function exceed a threshold defined by the application requirements.

Example 58 may include the apparatus of examples 54-57 and/or some other examples herein, wherein the DIM is for: implementing interface protocols for the one or more CCMs and the one or more NCMs; and exchanging information between an operator platform and the AFM, wherein the information comprises security information, error monitoring information, performance monitoring information, power and thermal management information, and AFM configuration information.

Example 59 may include the apparatus of examples 54-58 and/or some other examples herein, wherein the DIM comprises: DIM caching means; non-coherent cache control means corresponding to the one or more NCMs; coherent cache control means corresponding to the one or more CCMs, and wherein the coherent cache control means is for issuing read and write requests to a coherent system memory of the computer system, and for performing bus snooping operations on the DIM caching means.

Example 60 may include the apparatus of examples 51-59 and/or some other examples herein, wherein: the CCM is Intel® Ultra Path Interface (UPI), Intel® Accelerator Link (IAL), or Common Application Programming Interface (CAPI); the NCM is peripheral component interconnect express (PCIe); and the acceleration means is a field programmable gate array (FPGA).

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. A multi-chip package (MCP) to be employed in a computer system, the MCP comprising:
   multi-core processor circuitry comprising a plurality of processing cores, wherein one or more processing cores of the plurality of processing cores are to implement virtual machines (VMs); and
   hardware accelerator circuitry coupled with the multi-core processor circuitry via one or more coherent interconnects (IXs) and one or more non-coherent IXs, wherein individual coherent IXs of the one or more coherent IXs and individual non-coherent IXs of the one or more non-coherent IXs are bound to individual VMs based on workload characteristics of application functions of an application to be executed in the individual VMs, and the individual coherent IXs include one or more IX technologies that maintain cache coherence and the individual non-coherent IXs include one or more IX technologies that do not maintain cache coherence.

2. The MCP of claim 1, wherein the computer system comprises:
   system memory circuitry coupled with the multi-core processor circuitry; and
   a coherency domain, wherein the coherency domain comprises the system memory, last level cache (LLC) circuitry of the multi-core processor circuitry, the one or more coherent IXs, and cache circuitry of the hardware accelerator circuitry.

3. The MCP of claim 1, wherein the individual VMs comprise a set of virtual input/output (vIO) ports, wherein each vIO port of the set of vIO ports is bound to a coherent IX of the one or more coherent IXs or a non-coherent IX of the one or more non-coherent IXs according to a workload characteristic policy (WCP), wherein the WCP is to define a set of workload criteria for individual application functions of the application.

4. The MCP of claim 3, wherein the hardware accelerator circuitry comprises:

device interface unit (DIU) circuitry; and
   accelerated function unit (AFU) circuitry coupled with the DIU circuitry via programmable core cache interface (CCI-P) circuitry, wherein the AFU circuitry comprises one or more memory cells to be loaded with an accelerator image of a plurality of accelerator images.

5. The MCP of claim 4, wherein the CCI-P circuitry is to abstract the one or more coherent IXs and the one or more non-coherent IXs into individual virtual channels (VCs), wherein the individual VCs are to communicatively couple the individual application functions to individual accelerator functions of a plurality of accelerator functions.

6. The MCP of claim 5, wherein an individual processing core of the plurality of processing cores is to implement an IX selection module to:
   select the individual coherent IXs and the individual non-coherent IXs to be bound to corresponding ones of the individual VMs, wherein, to select the individual coherent IXs or the individual non-coherent IXs, the IX selection module is to:
   assign individual coherent IXs and the individual non-coherent IXs to corresponding ones of the individual VCs based on current workload characteristics and the WCP.

7. The MCP of claim 6, wherein, to select an individual coherent IX or an individual non-coherent IX, the IX selection module is to:
   select, as an initial IX before execution of an application function of the application, one of the individual coherent IX or the individual non-coherent IX based on an anticipated workload of the application function, wherein the anticipated workload is based on application requirements; and
   select another IX of the one or more coherent IXs or the one or more non-coherent IXs when current workload characteristics of the application function exceed a threshold defined by the application requirements.

8. The MCP of claim 4, wherein the DIU circuitry is to:
   implement interface protocols for the one or more coherent IXs and the one or more non-coherent IXs; and
   exchange information between an operator platform and the AFU circuitry, wherein the information comprises security information, error monitoring information, performance monitoring information, power and thermal management information, and AFU configuration information.

9. The MCP of claim 4, wherein the DIU circuitry comprises:
   DIU cache;
   one or more non-coherent cache controllers corresponding to the one or more non-coherent IXs;
   one or more coherent cache controllers corresponding to the one or more coherent IXs, and wherein the one or more coherent cache controllers are to issue read and write requests to a coherent system memory of the computer system and perform bus snooping operations on the DIU cache.

10. The MCP of claim 1, wherein:
    the one or more coherent IXs are Intel® Ultra Path Interface (UPI) IXs, Intel® Accelerator Link (IAL) IXs, or Common Application Programming Interface (CAPI) IXs;
    the one or more non-coherent IXs are peripheral component interconnect express (PCIe) IXs; and
    the hardware accelerator circuitry is a field programmable gate array (FPGA).

11. A computer system, comprising:
one or more network interface controllers (NICs);
system memory circuitry; and
one or more multi-chip packages (MCPs) communicatively coupled to one another and communicatively coupled with the system memory circuitry, wherein at least one MCP of the one or more MCPs is communicatively coupled with the one or more NICs, and wherein each MCP of the one or more MCPs comprises:
multi-core processor circuitry comprising a plurality of processing cores,
wherein one or more processing cores of the plurality of processing cores are to implement individual virtual machines (VMs);
hardware accelerator circuitry coupled with the multi-core processor circuitry via one or more coherent interconnects (IXs) and one or more non-coherent IXs, wherein the one or more coherent IXs include at least one IX technology that maintain cache coherence and the one or more non-coherent IXs include at least one IX technology that do not maintain cache coherence; and
a coherency domain, wherein the coherency domain comprises the system memory, last level cache (LLC) circuitry of the multi-core processor circuitry, the one or more coherent IXs, and cache circuitry of the hardware accelerator circuitry, and
wherein individual coherent IXs of the one or more coherent IXs and individual non-coherent IXs of the one or more non-coherent IXs are bound to individual VMs based on workload characteristics of application functions of an application to be executed in the individual VMs.

12. The computer system of claim 11, wherein the individual VMs comprise a set of virtual input/output (vIO) ports, wherein each vIO port of the set of vIO ports is bound to a coherent IX of the one or more coherent IXs or a non-coherent IX of the one or more non-coherent IXs according to a workload characteristic policy (WCP), wherein the WCP is to define a set of workload criteria for individual application functions of the application.

13. The computer system of claim 12, wherein the hardware accelerator circuitry comprises:
device interface unit (DIU) circuitry; and
accelerated function unit (AFU) circuitry coupled with the DIU circuitry via programmable core cache interface (CCI-P) circuitry, wherein the AFU circuitry comprises one or more memory cells to be loaded with an accelerator image of a plurality of accelerator images.

14. The computer system of claim 13, wherein an individual processing core of the plurality of processing cores is to implement an IX selection module to:
select individual coherent IXs and individual non-coherent IXs to be bound to corresponding ones of the individual VMs.

15. The computer system of claim 14, wherein the CCI-P circuitry is to abstract the one or more coherent IXs and the one or more non-coherent IXs into individual virtual channels (VCs), wherein the individual VCs are to communicatively couple the individual application functions to individual accelerator functions of a plurality of accelerator functions.

16. The computer system of claim 15, wherein, to select the individual coherent IXs and the individual non-coherent IXs, the IX selection module is to:
assign the one or more coherent interconnects and the one or more non-coherent interconnects to corresponding ones of the individual VCs based on current workload characteristics and the WCP.

17. The computer system of claim 15, wherein, to select the individual coherent IXs and the individual non-coherent IXs, the IX selection module is to:
select, as an initial IX before execution of an application function of the application, one of the individual coherent IX or the individual non-coherent IX based on an anticipated workload of the application function, wherein the anticipated workload is based on application requirements; and
select another IX of the one or more coherent IXs or the one or more non-coherent IXs when current workload characteristics of the application function exceed a threshold defined by the application requirements.

18. The computer system of claim 13, wherein the DIU circuitry is to:
implement interface protocols for the one or more coherent IXs and the one or more non-coherent IXs; and
exchange information between an operator platform and the AFU circuitry, wherein the information comprises security information, error monitoring information, performance monitoring information, power and thermal management information, and AFU configuration information.

19. The computer system of claim 13, wherein the DIU circuitry comprises:
DIU cache;
one or more non-coherent cache controllers corresponding to the one or more non-coherent IXs;
one or more coherent cache controllers corresponding to the one or more coherent IXs, and
wherein the one or more coherent cache controllers are to issue read and write requests to a coherent system memory of the computer system and perform bus snooping operations on the DIU cache.

20. The computer system of claim 11, wherein:
the one or more coherent IXs are Intel® Ultra Path Interface (UPI) IXs, Intel® Accelerator Link (IAL) IXs, or Common Application Programming Interface (CAPI) IXs;
the one or more non-coherent IXs are peripheral component interconnect express (PCIe) IXs; and
the hardware accelerator circuitry is a field programmable gate array (FPGA).

21. One or more non-transitory computer-readable media (NTCRM) comprising instructions, wherein execution of the instructions by one or more processor cores of a multi-core processor, is to cause the multi-core processor to:
control operation of individual virtual machines (VMs), wherein one or more applications are to be executed in the individual VMs; and
determine an interconnect (IX) assignment, the IX assignment to indicate one or more coherent IXs and one or more non-coherent IXs over which workloads are to be transferred, wherein the one or more coherent IXs include one or more IX technologies that maintain cache coherence and the one or more non-coherent IXs include one or more IX technologies that do not maintain cache coherence, and wherein the one or more coherent IXs and the one or more non-coherent IXs are to communicatively couple the multi-core processor with a hardware accelerator, and
for each application function of the one or more applications:

identify workloads of an application function,
send, over an assigned IX indicated by the IX assignment, program code or data of the application function to one or more acceleration function units (AFUs) of the hardware accelerator, and
obtain, over the assigned IX, outputs produced by the one or more AFUs based on execution of the program code or the data.

22. The one or more NTCRM of claim 21, wherein, to determine the IX assignment, execution of the instructions is to cause the multi-core processor to:
control operation of an IX selection module to select an individual coherent IX of the one or more coherent IXs or an individual non-coherent IX of the one or more non-coherent IXs.

23. The one or more NTCRM of claim 22, wherein, to select the individual coherent IX or the individual non-coherent IX, execution of the instructions is to cause the multi-core processor to control operation of the IX selection module to:
identify a workload characteristic policy (WCP) associated with an individual application of the one or more applications, wherein the WCP is to define a set of workload criteria for application functions of the individual application; and
select, for each application function of the individual application before execution of the individual application, the individual coherent IX or the individual non-coherent IX having workload criteria that corresponds with anticipated workload characteristics of the application function.

24. The one or more NTCRM of claim 23, wherein execution of the instructions is to cause the multi-core processor to control operation of the IX selection module to:
select, for each application function of the individual application during execution of the individual application, another individual coherent IX or another individual non-coherent IX having workload criteria that corresponds with current workload characteristics when the current workload characteristics exceed workload criteria of a currently assigned IX as indicated by the WCP.

25. The one or more NTCRM of claim 21, wherein the IX assignment is based on virtual channels (VCs) that correspond to the one or more coherent IXs and the one or more non-coherent IXs, wherein individual VCs are to communicatively couple individual application functions to individual accelerator functions of a plurality of accelerator functions implemented by the hardware accelerator.

26. The one or more NTCRM of claim 23, wherein the individual VMs comprise a set of virtual input/output (vIO) ports, wherein each vIO port of the set of vIO ports is bound to a coherent IX of the one or more coherent IXs or a non-coherent IX of the one or more non-coherent IXs according to the WCP.

27. A multi-chip package (MCP) to be employed in a computer system, the MCP comprising:
multi-core processor circuitry comprising a plurality of processing cores, wherein one or more processing cores of the plurality of processing cores are to implement virtual machines (VMs), and the VMs comprise a set of virtual input/output (vIO) ports; and
hardware accelerator circuitry coupled with the multi-core processor circuitry via one or more coherent interconnects (IXs) and one or more non-coherent IXs, wherein:
individual coherent IXs of the one or more coherent IXs and individual non-coherent IXs of the one or more non-coherent IXs are bound to individual VMs based on workload characteristics of application functions of an application to be executed in the individual VMs,
each vIO port of the set of vIO ports is bound to a coherent IX of the one or more coherent IXs or a non-coherent IX of the one or more non-coherent IXs according to a workload characteristic policy (WCP), and
the WCP is to define a set of workload criteria for individual application functions of the application.

28. The MCP of claim 27, wherein the computer system comprises:
system memory circuitry coupled with the multi-core processor circuitry; and
a coherency domain, wherein the coherency domain comprises the system memory, last level cache (LLC) circuitry of the multi-core processor circuitry, the one or more coherent IXs, and cache circuitry of the hardware accelerator circuitry.

29. The MCP of claim 27, wherein the hardware accelerator circuitry comprises:
device interface unit (DIU) circuitry; and
accelerated function unit (AFU) circuitry coupled with the DIU circuitry via programmable core cache interface (CCI-P) circuitry, wherein the AFU circuitry comprises one or more memory cells to be loaded with an accelerator image of a plurality of accelerator images.

30. The MCP of claim 29, wherein the CCI-P circuitry is to abstract the one or more coherent IXs and the one or more non-coherent IXs into individual virtual channels (VCs), wherein the individual VCs are to communicatively couple the individual application functions to individual accelerator functions of a plurality of accelerator functions.

31. The MCP of claim 30, wherein an individual processing core of the plurality of processing cores is to implement an IX selection module to:
select the individual coherent IXs and the individual non-coherent IXs to be bound to corresponding ones of the individual VMs, wherein, to select the individual coherent IXs or the individual non-coherent IXs, the IX selection module is to:
assign the one or more coherent IXs and the one or more non-coherent IXs to corresponding ones of the individual VCs based on current workload characteristics and the WCP.

32. The MCP of claim 31, wherein, to select an individual coherent IX or an individual non-coherent IX, the IX selection module is to:
select, as an initial IX before execution of an application function of the application, one of the individual coherent IX or the individual non-coherent IX based on an anticipated workload of the application function, wherein the anticipated workload is based on application requirements; and
select another IX of the one or more coherent IXs or the one or more non-coherent IXs when current workload characteristics of the application function exceed a threshold defined by the application requirements.

33. The MCP of claim 29, wherein the DIU circuitry is to:
implement interface protocols for the one or more coherent IXs and the one or more non-coherent IXs; and
exchange information between an operator platform and the AFU circuitry, wherein the information comprises security information, error monitoring information, performance monitoring information, power and thermal management information, and AFU configuration information.

34. The MCP of claim 29, wherein the DIU circuitry comprises:

DIU cache;

one or more non-coherent cache controllers corresponding to the one or more non-coherent IXs;

one or more coherent cache controllers corresponding to the one or more coherent IXs, and wherein the one or more coherent cache controllers are to issue read and write requests to a coherent system memory of the computer system and perform bus snooping operations on the DIU cache.

35. The MCP of claim 27, wherein:

the one or more coherent IXs are Intel® Ultra Path Interface (UPI) IXs, Intel® Accelerator Link (IAL) IXs, or Common Application Programming Interface (CAPI) IXs;

the one or more non-coherent IXs are peripheral component interconnect express (PCIe) IXs; and the hardware accelerator circuitry is a field programmable gate array (FPGA).

\* \* \* \* \*

UNITED STATES PATENT AND TRADEMARK OFFICE
CERTIFICATE OF CORRECTION

| | |
|---|---|
| PATENT NO. | : 11,249,779 B2 |
| APPLICATION NO. | : 15/853670 |
| DATED | : February 15, 2022 |
| INVENTOR(S) | : Gerald Rogers et al. |

It is certified that error appears in the above-identified patent and that said Letters Patent is hereby corrected as shown below:

In the Claims

Column 30
Line 51, Claim 21, "...multi-core processor, is to..." should read "...multi-core processor is to..."

Signed and Sealed this
Twenty-first Day of March, 2023

Katherine Kelly Vidal
*Director of the United States Patent and Trademark Office*